(12) United States Patent
Ozawa et al.

(10) Patent No.: US 12,731,487 B2
(45) Date of Patent: Sep. 8, 2026

(54) SYSTEMS AND METHODS FOR VEHICLE PARKING GUIDANCE

(71) Applicant: Adeia Guides Inc., San Jose, CA (US)

(72) Inventors: Toshiro Ozawa, Irvine, CA (US); Ning Xu, Irvine, CA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/754,292

(22) Filed: Jun. 26, 2024

(65) Prior Publication Data

US 2026/0004658 A1 Jan. 1, 2026

(51) Int. Cl.
*G06Q 10/047* (2023.01)
*G06V 20/52* (2022.01)
*G08G 1/14* (2006.01)

(52) U.S. Cl.
CPC ........... *G08G 1/141* (2013.01); *G06Q 10/047* (2013.01); *G06V 20/52* (2022.01); *G08G 1/146* (2013.01); *G06V 2201/08* (2022.01)

(58) Field of Classification Search
None
See application file for complete search history.

(56) References Cited

U.S. PATENT DOCUMENTS 4,507,654 A * 3/1985 Stolarczyk ............ G08B 13/08 340/556
4,709,153 A * 11/1987 Schofield ............... G08B 29/04 250/353
8,791,838 B2 7/2014 Scofield et al.
9,594,956 B2 3/2017 Cohen et al.
2012/0056758 A1* 3/2012 Kuhlman ................. G08G 1/14 340/932.2
2013/0258110 A1* 10/2013 DeMarco ............... G08B 25/14 340/517
2016/0012726 A1* 1/2016 Wang .................. G08G 1/0141 340/932.2
2018/0283894 A1* 10/2018 Alneghaimish .......... G08G 1/04
2019/0179336 A1* 6/2019 Colijn ................. G05D 1/0291
2019/0287400 A1 9/2019 Cao et al.
2021/0398424 A1 12/2021 Lee et al.

FOREIGN PATENT DOCUMENTS

WO 2017/033066 A1 3/2017

OTHER PUBLICATIONS

"Hungarian algorithm," Wikipedia, retrieved from https://en.wikipedia.org/wiki/Hungarian_algorithm, last edited on Jun. 4, 2024, pp. 14.
"Tis Parking Guidance System Solutions," Tis, Inc., retrieved from https://tisparking.com/, retrieved on Jul. 5, 2024, pp. 16.

* cited by examiner

*Primary Examiner* — John F Mortell
(74) *Attorney, Agent, or Firm* — HG LAW LLP

(57) ABSTRACT

A plurality of trigger points within the parking facility are monitored for trigger events. For each trigger event detected within the parking facility, a respective optimal parking spot is determined, using a global optimization algorithm, for each respective vehicle of a plurality of vehicles within the parking facility that have not yet parked in a parking spot. The optimal parking spots are then assigned to each respective vehicle. Guidance is then provided, to each respective vehicle of the plurality of vehicles, at one or more checkpoints within the parking facility.

22 Claims, 13 Drawing Sheets

1 2 3 4 5
11 21 12 22 13 23 14 24 15 25

31 41 32 42 33 43 34 44 35 45
51 52 53 54 55

1600

| | Spot 21 | Spot 33 | Spot 35 | Spot 41 | Spot 42 | Spot 43 | Spot 51 | Spot 52 | Spot 54 | Spot 55 |
|---|---|---|---|---|---|---|---|---|---|---|
| Vehicle 1 | 8 | 6 | 5 | 6 | 5 | 4 | 0 | 0 | 0 | 0 |
| Vehicle 2 | 7 | 6 | 4 | 9 | 8 | 7 | 0 | 0 | 0 | 0 |
| Vehicle 3 | 7 | 6 | 5 | 8 | 8 | 7 | 0 | 0 | 0 | 0 |
| Vehicle 4 | 0 | 0 | 0 | 0 | 0 | 0 | 10 | 9 | 8 | 7 |

FIG. 16

SYSTEMS AND METHODS FOR VEHICLE PARKING GUIDANCE

BACKGROUND

This disclosure relates to vehicle parking guidance systems. In particular, solutions for guiding vehicles to available parking spaces are provided.

SUMMARY

Finding a good parking spot is not always easy at a crowded shopping mall, theme park or sporting event. It is even worse when there are no GPS/connection signals in an indoor parking garage. There are many arts to help drivers find parking spots, for example, some parking lots have information displays showing the number of available spots on each floor, or indicators on the ceiling to show the status (occupied/empty) of each spot. Some could assign a vacant parking space when the vehicle enters the parking lot and help it to navigate to the assigned spots, and even reassign a spot to the vehicle when the assigned one is taken. These are useful to the driver looking for a parking spot but only consider a single vehicle at a time and would run into problems when multiple vehicles are competing for parking spots and vehicles may not obey the assignment or the planned route intentionally or by mistake.

For example, when a vehicle enters a parking structure, the system may find an unassigned spot and assign to it. This is not an optimal case considering there are multiple vehicles driving to their assigned spots and this new entering vehicle from one of the entrances may reach a vacant but assigned spot earlier than other spots and will take that vacant spots instead of going to its assigned one.

In another example, the vehicle assigned a spot and instructed by the navigation system may go past the spot without taking it, in this case the navigation system may try to re-route it back, which may not make sense considering the detour to come back and there are possible vacant spots on the route back. When there is a heavily dynamic situation within a parking structure, it is difficult to solve the problem if only one vehicle is considered at a time. Global optimization would be needed. At the same time, in this situation, navigation instructions would be better not providing a route to the target location, but only providing the direction at each intersection so that the user will not always get an updated re-routing.

An existing solution provides outdoor and indoor navigation assistance by using reference points to help the existing navigation technologies. Another existing solution provides a parking lot managing system with intelligent imaging, which could help to find which spot is empty and occupied, and use license plate recognition to determine whether there is any parking permit infringement. Neither of these methods teaches how to provide a globally optimized dynamic turn-by-turn guide for each vehicle to the best parking lot for it.

A third existing solution provides a parking guidance system, where many of the enablement technology like license plate recognition, of this IDF are shown to be available. A fourth existing solution involves a parking guide system that can recognize a vehicle entering the entrance, identify an empty parking space, allocate a parking space to the vehicle, and guide the vehicle to the space. Such a vehicle-by-vehicle solution may be less effective during busy hours.

A fifth existing solution determines a target parking space based on the vehicle entry position and the vacancy information of the parking lot and plan a route for the vehicle. This solution uses cameras at intersections to identify the vehicle and an indication system to provide direction. The route will be modified if the target lot is taken by others or new vacant becomes available. However, this dynamic adjustment is still single-vehicle based, and they do not consider a global optimization to assign parking lots at all possible triggering events, for example, when a vehicle deviates from the planned route.

Other existing solutions consider different criteria (e.g., distance to a destination and/or costs associated with the parking spot) when assigning a spot to a vehicle, and they can re-route the driver based on parking factors including traffic and parking density. However, none of the existing solutions teach how to consider simultaneously optimizing the assignments for all vehicles and dynamically changing them when there is a new situation.

This disclosure introduces a way to guide vehicles (autonomous or driven by a human) looking for a parking lot to the globally optimized empty spots through turn-by-turn instructions. This proposed core method does not require to use any features on the vehicle (e.g., Radar, LIDAR, camera, GPS or connectivity) except that the camera is needed for autonomous driving car, as they have to use it anyway, and the connection could be needed if the system want to deliver the instruction to the vehicle or apps associated with the vehicle/user.

Security cameras collaboratively work to constantly detect and monitor empty (and potential) parking spots. The security cameras recognize each individual vehicle at the entrance(s) and keep tracking them so that the system has a full understanding of where each vehicle is at each timestamp. It also has descriptive metadata related to the vehicle, including license numbers, make and model, color, disability decal, size, speed, moving direction, EV or not, etc. At each checkpoint, where the vehicle may have multiple choices, for example, turn right or go straight, a display is set up to guide the approaching vehicle in the direction to the assigned optimal spot (or the "best" spot) at the moment for the vehicle. The system runs a global optimization algorithm to dynamically assign the best spot for each vehicle needing to be parked based on the collected information of both the vehicle and the spot (e.g., compact only, disability, EV charger, etc.) at each triggering event.

When the vehicle approaches the assigned spot, an indication is given in addition to the existing green/red indications (for example, green LED flashing, or optionally direction on a mobile application accessible by the driver). When the vehicle is parked, the system updates the information for both the spot and the vehicle, for example, marks the spot as occupied, marks the vehicle as parked. Same will be done when a vehicle is leaving the parking spot.

Unlike existing systems that provide solutions on a vehicle-by-vehicle basis, this disclosure implements a global optimization algorithm that considers all vehicles and parking spots simultaneously to optimize the solution for all vehicles. The system dynamically adjusts parking spot assignments in real-time, responding to various trigger events such as vehicles entering or leaving the parking lot, spots being taken or vacated, and vehicles deviating from their planned routes. A cost matrix is constructed where the cost of assigning a vehicle to a parking spot is determined by a combination of a time cost and a "fit score." The time cost represents the amount of time it will take for the vehicle to reach a given parking spot and/or the amount of time it will take for an occupant of the vehicle to reach a destination from a given parking spot. The fit score may account for vehicle size, driver preference, special requirements (like disability access and EV charging), and other factors. The use of the Hungarian method, a classical optimization algorithm, is adapted for the dynamic and real-time constraints of parking lot management, providing an optimal assignment that can be recalculated as conditions change. Directional guidance is provided at each checkpoint without giving a complete route, reducing the need for updated re-routing and making the system more user friendly in heavily dynamic situations.

Systems and methods are described herein for providing parking guidance for vehicles in a parking facility. A plurality of trigger points within the parking facility are monitored for trigger events. The trigger points may include each of the parking spots within the entire parking facility, as well as one or more of an entrance to the parking facility, an exit from the parking facility, or any number of checkpoints within the parking facility. The parking facility may include multiple entrances and exits, each of which may be a trigger point. For each trigger event detected within the parking facility, a respective optimal parking spot is determined, using a global optimization algorithm, for each respective vehicle of a plurality of vehicles within the parking facility that have not yet parked in a parking spot. The optimal parking spots are then assigned to each respective vehicle. Guidance is then provided, to each respective vehicle of the plurality of vehicles, as each respective vehicle approaches one or more checkpoints within the parking facility. For example, a vehicle may be routed to pass three checkpoints before reaching an assigned parking spot. As the vehicle approached a first checkpoint, the first checkpoint provides guidance to the vehicle to direct the vehicle along the route toward a second checkpoint. As the vehicle approaches the second checkpoint, the second checkpoint provides additional guidance to the vehicle to direct the vehicle along the route toward a third checkpoint. As the vehicle approaches the third checkpoint, the third checkpoint provides final guidance to the vehicle to direct the vehicle toward its assigned parking spot. In some embodiments, an indicator may be positioned in the vicinity of each parking spot and may be used to indicate to the vehicle its assigned spot (e.g., flashing light, text display, etc.). In some implementations, guidance data for the entire route may be transmitted to the vehicle for use by a navigation application within the vehicle. Alternatively or additionally, the guidance data for the entire route may be transmitted to a mobile device of the driver for use by a navigation application or parking facility companion application on the mobile device.

In some embodiments, the global optimization algorithm minimizes a total estimated travel time for the plurality of vehicles. The total estimated travel time may represent a total amount of time for all vehicles of the plurality of vehicles to reach an assigned parking spot. The total estimated travel time may also represent a total amount of time for occupants of all vehicles of the plurality of vehicles to reach their respective destinations, wherein a travel time for occupants of a respective vehicle includes an amount of time needed to walk from an assigned parking spot to their respective destination. For example, the destination of each vehicle may be used to determine the optimal parking spot such that the vehicle reaches a parking spot in a short amount of time while still being within a threshold walking distance of the destination.

In some implementations, to assign to each vehicle of the plurality of vehicle, using a global optimization algorithm, a parking spot, at least one available parking spot is identified. For each available parking spot, a respective time cost and fit score for each vehicle of the plurality of vehicles are calculated, wherein the time cost represents an amount of time it will take for the vehicle to reach a given parking spot and/or an occupant of the vehicle to reach a destination from a given parking spot and the fit score represents how well a respective parking spot matches with a respective vehicle. A cost matrix is then constructed based on a combination of the time costs and the fit scores.

In some embodiments, information describing each vehicle of the plurality of vehicles is collected and stored. This information may be used to identify each vehicle as it moves through the parking facility. The position of each vehicle may be tracked within the parking facility using sensors and/or surveillance devices. The information may also be used to determine if there are any special requirements for the vehicle, such as EV charging, a compact space, etc.

In some implementations, tracking a position of each vehicle of the plurality of vehicles within the parking facility comprises capturing one or more images of each respective vehicle of the plurality of vehicles using one or more cameras. Based on the one or more images and a respective location of each of the one or more cameras, a current position of each respective vehicle of the plurality of vehicles can be determined.

In some embodiments, providing, to each respective vehicle of the plurality of vehicles, at one or more checkpoints within the parking facility, guidance to a parking spot assigned to the respective vehicle comprises transmitting, to each respective vehicle, as the respective vehicle reaches the checkpoint, an indication of a direction in which the first vehicle should proceed. The indication may be one or more of a visual indication, an audio indication, or a text indication. In some implementations, multiple indications intended for different vehicles may be output simultaneously. For example, a multi-line text display may be located at the checkpoint. Each line of the display may include an identifier of a specific vehicle (e.g., license plate number or the color, make, and model of the vehicle) and a direction in which that vehicle should proceed.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 16 is an illustrative example of a cost matrix for assigning vehicles to available parking spots, in accordance with some embodiments of the disclosure.

DETAILED DESCRIPTION

Figure 1:
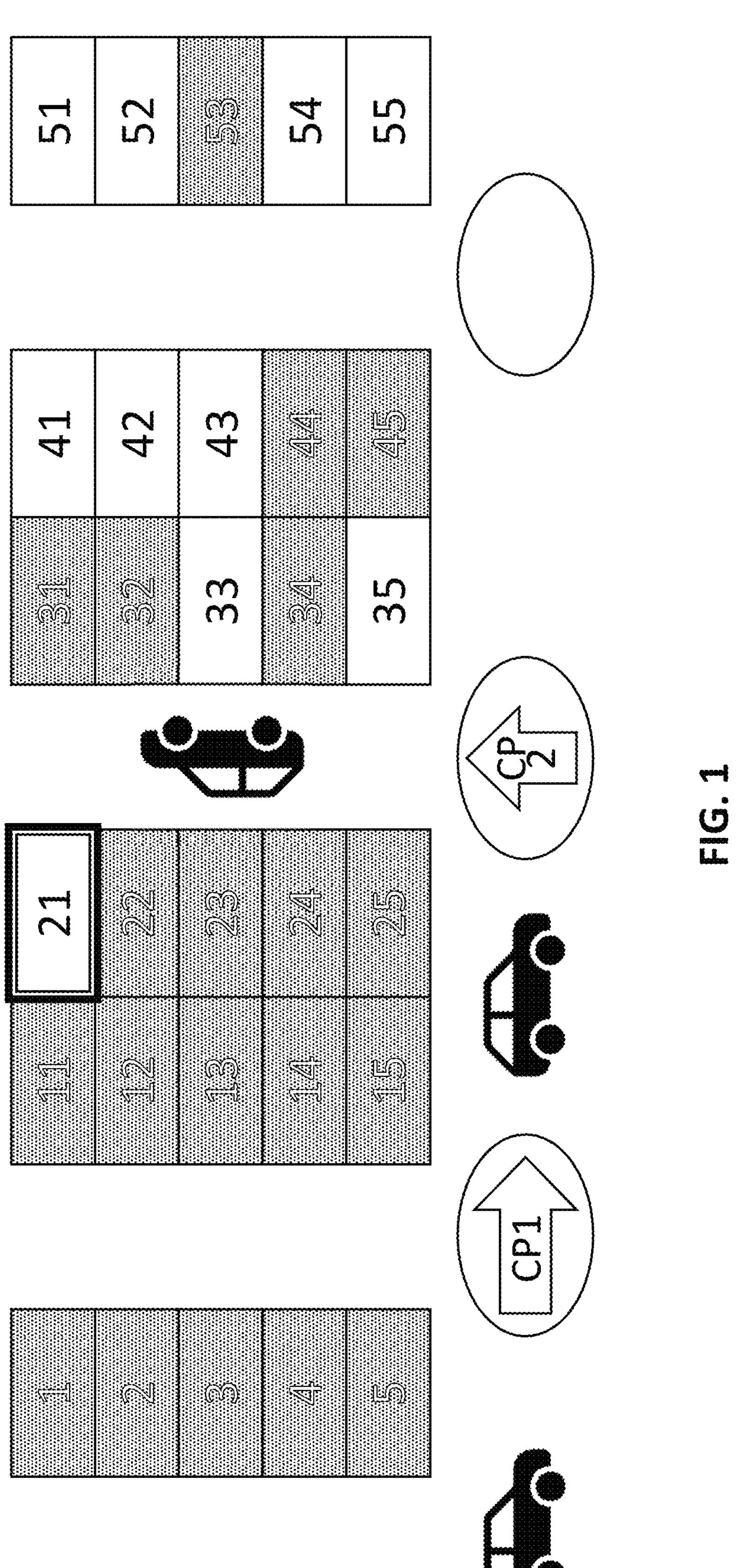
FIG. 1 depicts a vehicle entering a parking lot and being guided to an available parking spot, in accordance with some embodiments of the disclosure.

FIG. 1 shows a vehicle entering the parking garage from an entrance on the bottom left. Parking spots are ranked by some predefined measures. The most preferred spot in the parking garage may be in the northwest quadrant of the parking lot. For example, an elevator may be located in the northwest corner. The vehicle enters the parking garage and was assigned spot 21 based on the global optimization algorithm (GOA). The vehicle approaches the first checkpoint CP1 at the entrance. Nothing has changed since the assigned of spot 21 to the vehicle, and the display at CP1 will instruct the vehicle to proceed straight ahead. The driver may follow the direction provided by the display at CP1 and the vehicle moves towards checkpoint CP2. Still nothing has changed, and the display at CP2 will instruct the vehicle to turn left to reach spot 21. The driver may again follow the direction and the vehicle turns left and parks at spot 21. This triggers an event to the GOA to recalculate the assignments to any other vehicles in the parking garage that have not yet parked. This may include vehicles that have already been assigned a spot.

Figure 2:
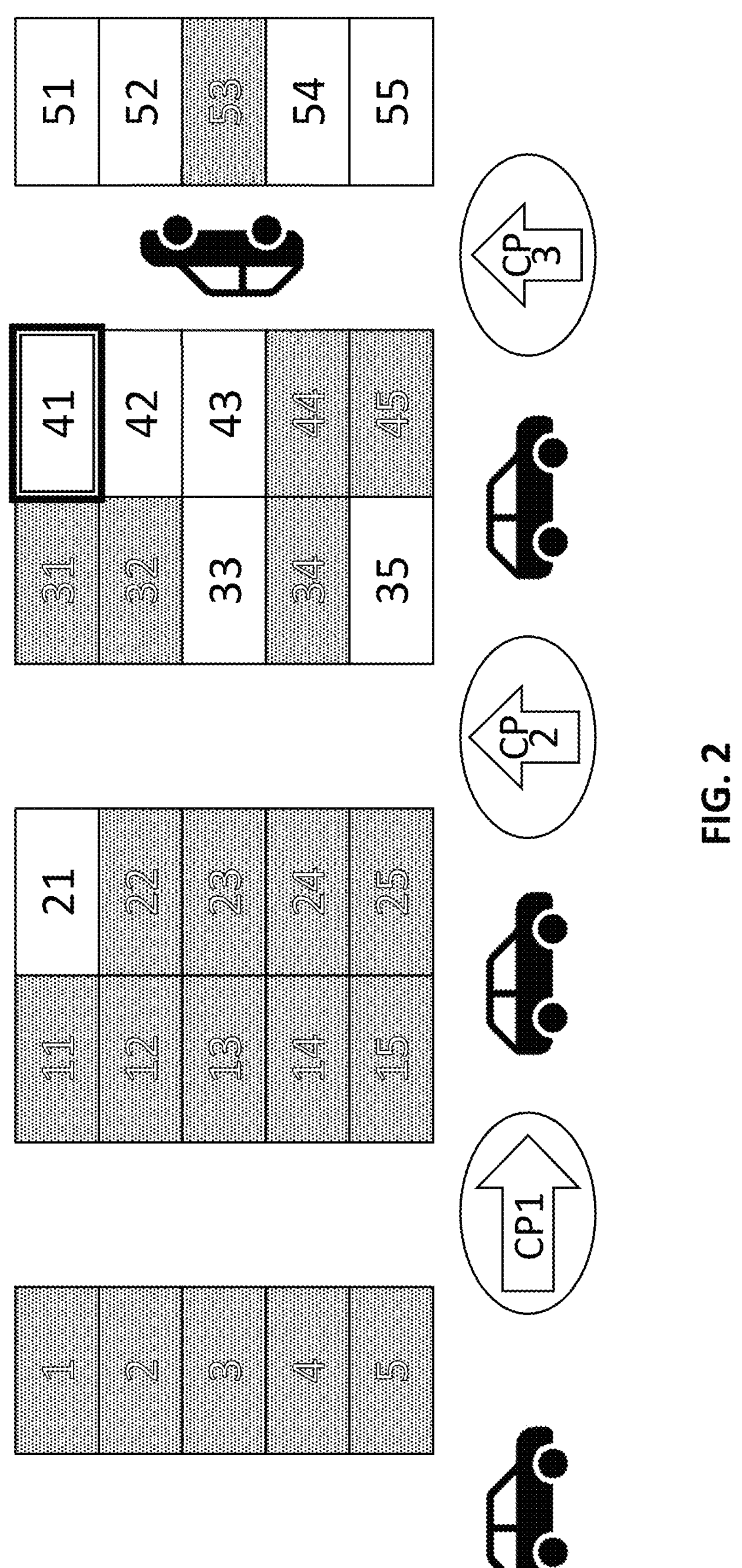
FIG. 2 depicts a guidance of a vehicle to an available parking spot after the vehicle misses or ignores guidance at a checkpoint, in accordance with some embodiments of the disclosure.

FIG. 2 shows an example in which the driver misses or ignores the direction at CP2. This case follows the same situation as FIG. 1, until the vehicle approaches CP2. In this example, at CP2, the driver did not follow the direction (either intentionally or unintentionally) to turn left toward spot 21 and instead continued straight toward checkpoint CP3. The system will notice this event (e.g., using a surveillance camera or other tracking methods) and trigger the GOA to recalculate the optimal assignments. The vehicle may be reassigned to spot 41. At CP3, the vehicle will then be instructed to turn left. After turning left, the vehicle may park in spot 41, or may take a spot 42 instead of spot 41. In either case, the vehicle parking will trigger the GOA to again optimize the assignments for all the other vehicles looking for parking.

In another example, the assigned spot 21 is taken by another vehicle before the vehicle to which spot 21 is assigned is able to park there. The GOA recalculates the assigned spots for all vehicles when it receives the trigger the spot 21 is now occupied. The system reassigns spot 41 to the vehicle to which spot 21 was assigned, and the direction at CP2 changes from "left" to "straight" before the vehicle approaches. The driver may not aware that a reassignment has occurred. This prevents potential conflicts between drivers when an assigned spot is taken by another vehicle before the assignee vehicle arrives.

Figure 3:
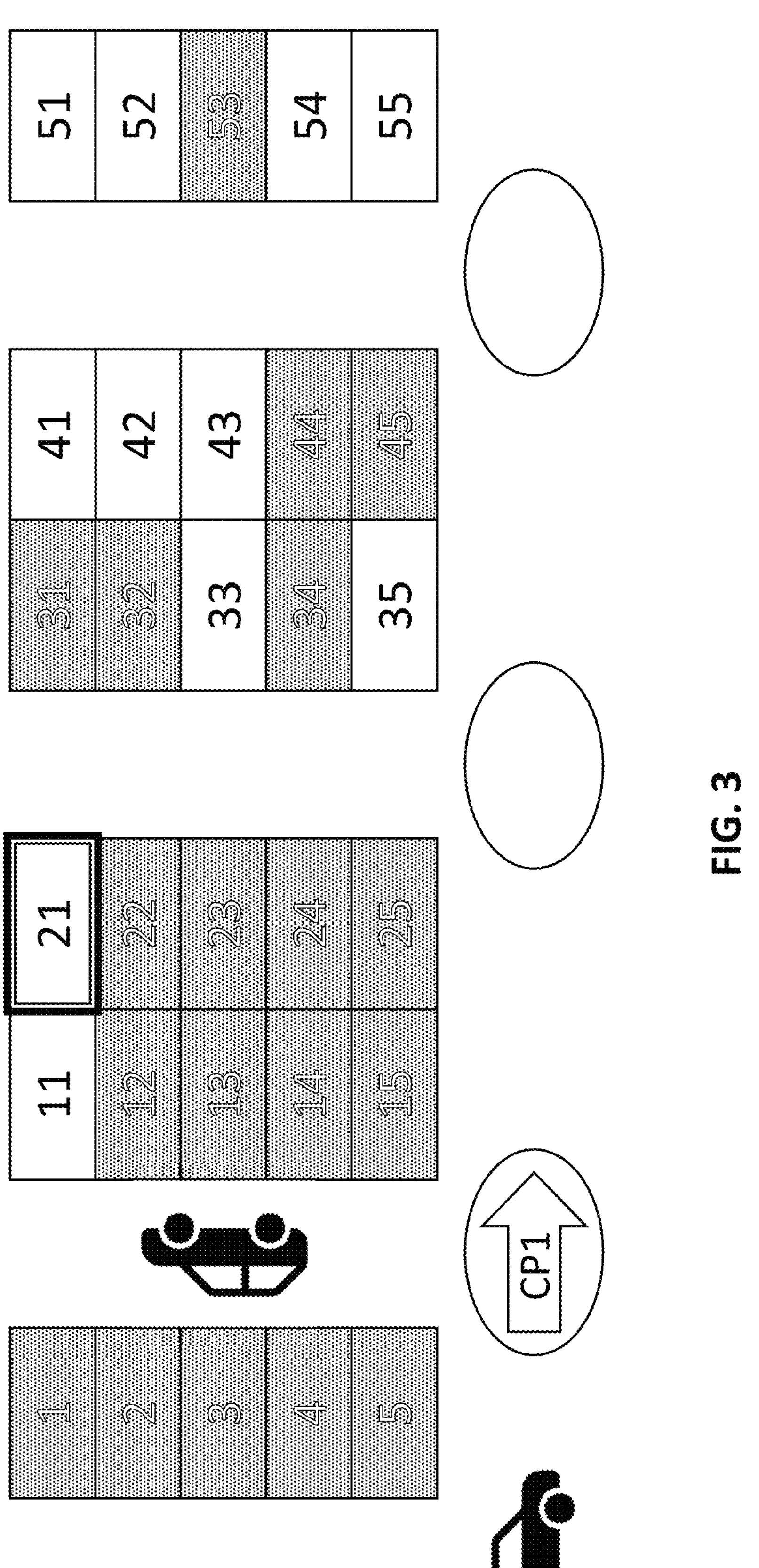
FIG. 3 depicts a vehicle parking in an unassigned parking spot without guidance, in accordance with some embodiments of the disclosure.

FIG. 3 shows another example where a driver parks in an unassigned spot without any direction. In this example, just when a first vehicle is passing CP1, the driver observes that a vehicle is leaving spot 11, which is a better option than the assigned spot. The driver may or may not know where their assigned spot is located and may determine that spot 11 is a "good" spot based on personal preferences or other factors. The driver ignores the direction at CP1, and turns left rather than proceeding straight. This will trigger the GOA to recalculate spot assignments. However, until the other vehicle leaves spot 11, the first vehicle will still be assigned to spot 21. When the vehicle at spot 11 leaves the spot, the GOA will be triggered again and spot 11 will then be assigned to the vehicle. This assignment may, for example, be based on proximity of the vehicle to the newly vacant spot.

Figure 4:
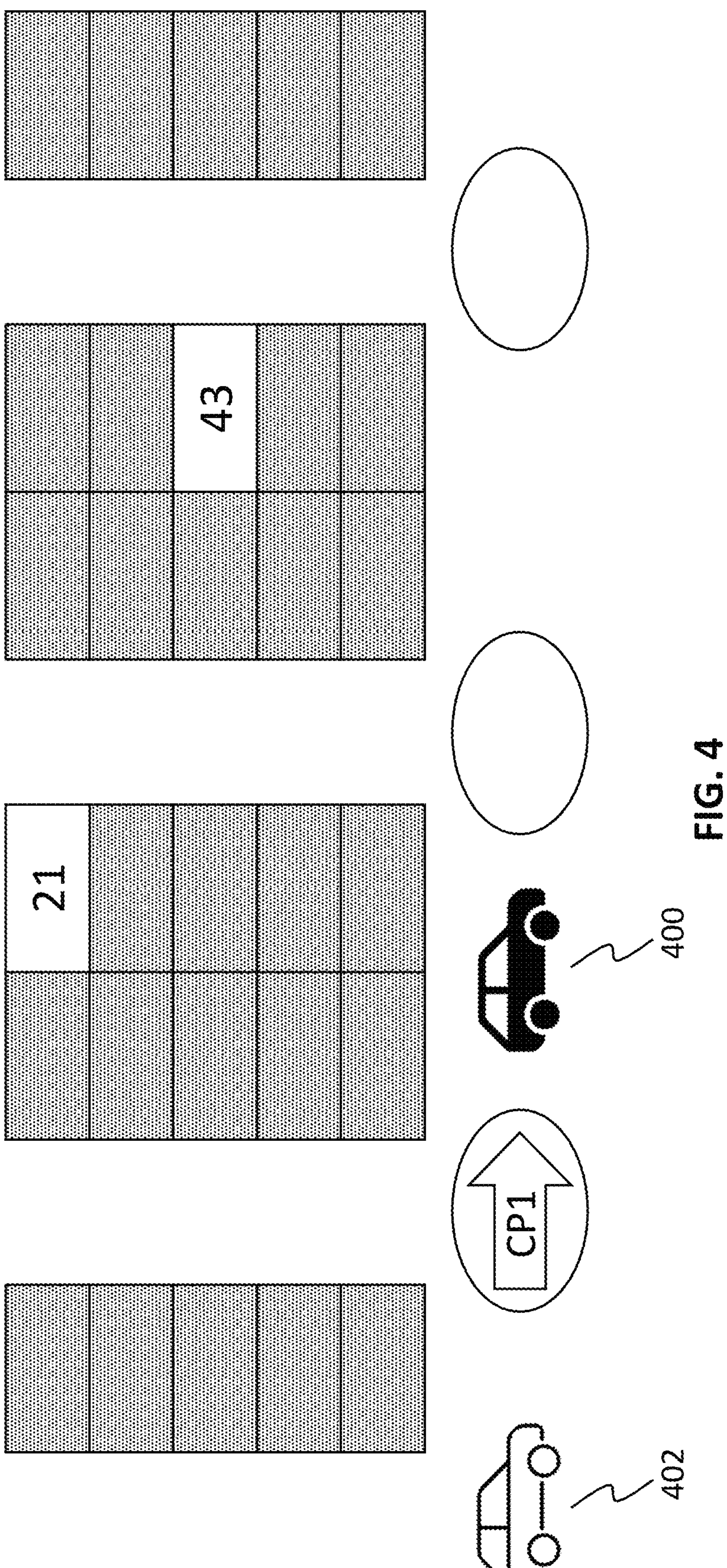
FIG. 4 depicts an illustrative example of global optimization of parking guidance after a trigger event, in accordance with some embodiments of the disclosure.

FIG. 4 shows an example of global optimization after a trigger. Vehicle 400 was assigned to spot 21, and vehicle 402, entering the parking facility after vehicle 400, was assigned to spot 43. When the vehicle 400 is approaching checkpoint CP2, the instruction at checkpoint CP2 will tell vehicle 400 to turn left. Vehicle 400 may choose to go straight, intentionally or unintentionally. This deviation will trigger a reassignment of parking spots through the GOA. Vehicle 400 will now be assigned to spot 43, while vehicle 402 will be assigned to spot 21 based on the optimization criteria. When vehicle 400 approaches checkpoint CP3, it will be directed to turn left to approach spot 43. When vehicle 402 approaches checkpoint CP2, it will be instructed to turn left at that point to approach spot 21. Without this dynamically global optimization, vehicle 400 may still be navigated to spot 21, while vehicle 402 is still being directed to spot 43. This may cause confusion, car accidents, or other issues, as vehicle 400 may not follow the guidance directions and take spot 43 instead when passing checkpoint CP3, and vehicle 402 will pass checkpoint CP2 and miss the turn just to find that spot 43 was already taken by vehicle 400.

As shown in the cases above, every vehicle is assigned a parking spot when it enters the parking lot and approaches the first checkpoint. However, the exact location of the assigned spot will not be informed to the vehicle until it is close enough (only turn-by-turn directions are provided at every checkpoint). The global optimization algorithm allows the system to dynamically reassign parking spots based on the real time vacancy information and trigger events from checkpoints and parking spots. The optimization will help improve the user experience by giving fair assignments based on their needs, with some level of freedom for the drivers to park where they want, by allowing them to ignore the assignment.

Figure 5:
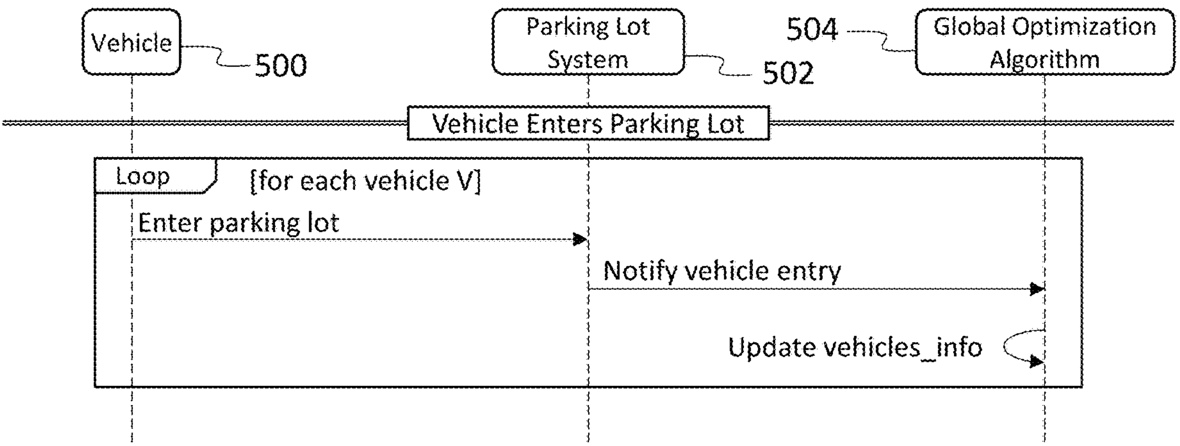
FIG. 5 is sequence diagram for updating vehicle information within a parking guidance system, in accordance with some embodiments of the disclosure.

FIG. 5 is sequence diagram for updating vehicle information within a parking guidance system, in accordance with some embodiments of the disclosure. As each vehicle 500 enters the parking lot, it is detected by the parking lot system 502. The entry of the vehicle triggers a notification to the Global Optimization Algorithm (GOA) 504. Upon notification of each new vehicle entering the parking lot, the GOA 504 updates its vehicle information, which includes details like vehicle size, vehicle type, any special requirements (like disability access or EV charging), and estimated walking exit location. The GOA may then use the vehicle information when calculating globally optimal parking spot assignments within the parking facility.

Figure 6:
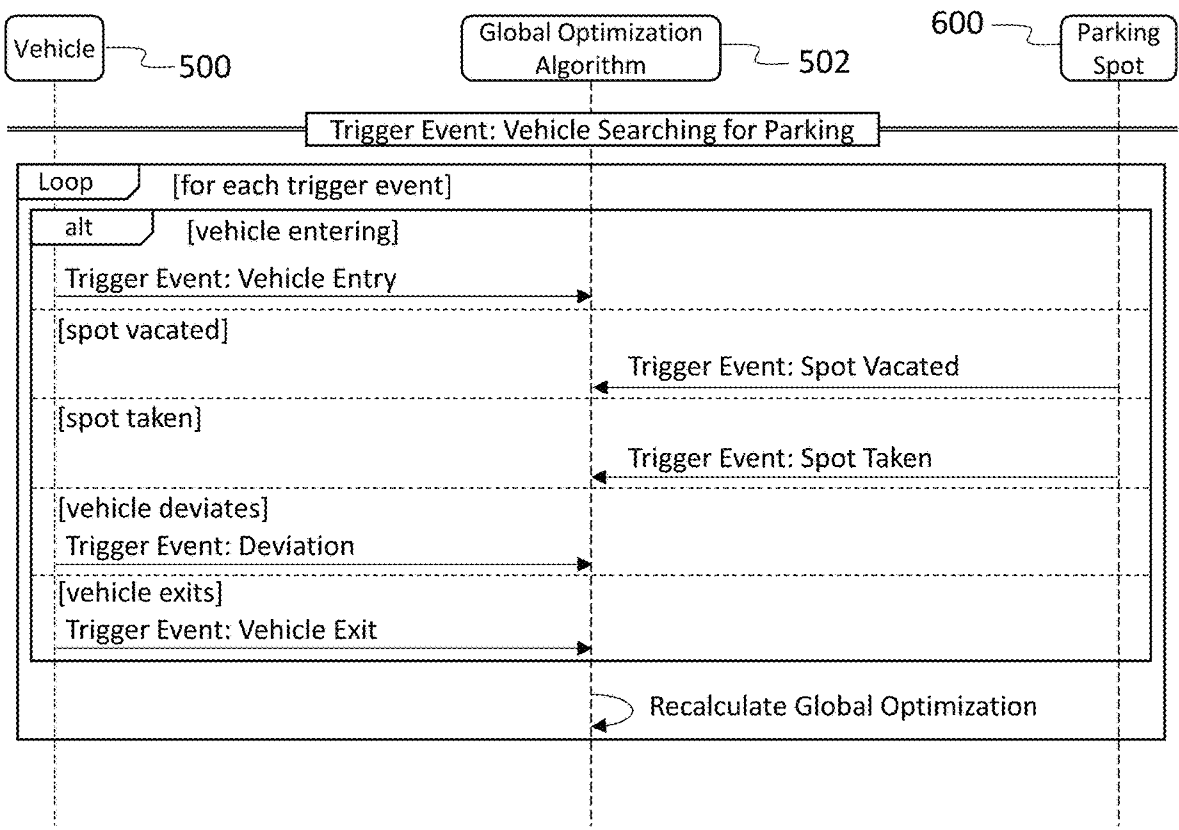
FIG. 6 is a sequence diagram for recalculating global optimization within a parking guidance system, in accordance with some embodiments of the disclosure.

FIG. 6 is a sequence diagram for recalculating global optimization within a parking guidance system, in accordance with some embodiments of the disclosure. Several different events may trigger the GOA to calculate or recalculate globally optimal parking spot assignments. Every time a trigger event is detected, the GOA may perform a recalculation. A vehicle 500 may be detected to have entered the parking facility, as described above in connection with FIG. 5, and trigger the GOA 502 to recalculate globally optimal parking spot assignments for all vehicles. Other trigger events caused by vehicle 500 may include deviation from parking guidance instructions or exiting the parking facility. For example, at an intersection, a vehicle may proceed in a different direction than planned. Other examples include a vehicle passing the spot to which it is assigned without parking, waiting for a vehicle exiting a parking spot and signaling an intention (e.g., using a turn signal) that it will park in that spot, or exiting the parking facility without parking (e.g., the vehicle entered the parking facility only to drop off passengers). Other trigger events may be detected at a parking spot 600. For example, parking spot 600 may be taken. This may include an assigned spot being taken by its assigned vehicle, an assigned spot being taken by a different vehicle than the vehicle to which it is assigned, or an unassigned spot being taken. As another example, parking spot 600 may be vacated by the vehicle currently parked there. Any detected trigger event causes the GOA 502 to recalculate globally optimal parking spot assignments.

Figure 7:
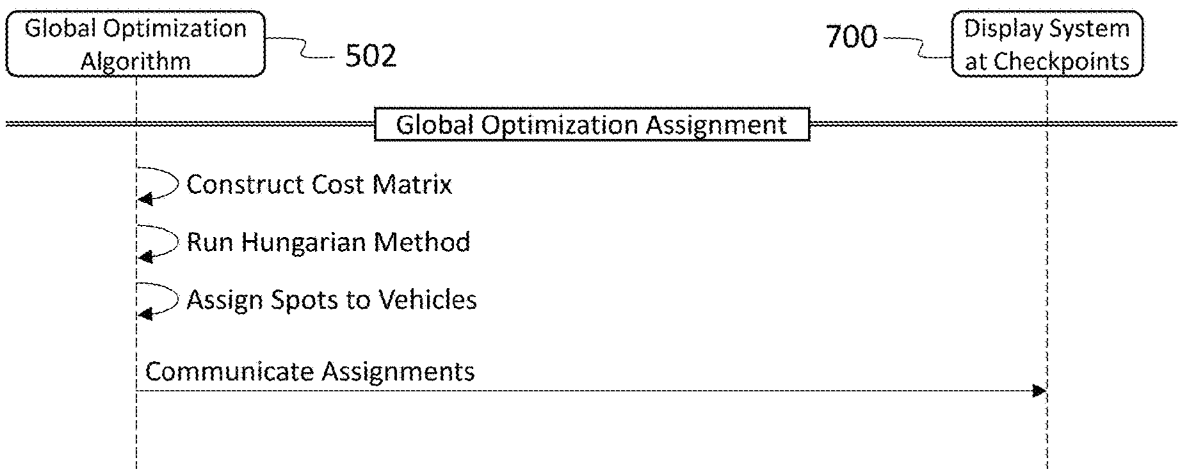
FIG. 7 is a sequence diagram for global optimization of parking spot assignments within a parking guidance system, in accordance with some embodiments of the disclosure.

FIG. 7 is a sequence diagram for global optimization of parking spot assignments within a parking guidance system, in accordance with some embodiments of the disclosure. GOA 502 calculates a globally optimal parking spot for each vehicle in the parking facility that has not yet parked in a parking spot. The GOA first constructs a cost matrix where vehicles are matched with parking spots based on a variety of factors to determine the best fit. GOA 502 takes as inputs parking lot information and vehicle information. For example, a data structure parking_lot_info may contain the parking lot's layout, types of spots, and their locations, the roads within the parking lot, and a dynamic list or map holding the current status (occupied, empty, assigned, remaining width, etc.) of each parking spot. This parking spot status will be updated dynamically, for example, when a vehicle entering or leaving a spot. A dynamic list vehicles_info may contain the current vehicles that are in the parking with details about when the vehicle entered the lot, where is the location of the vehicle, its moving speed and direction, and other information, such as license plate, size, and any special requirements (disability, EV charging, etc.), and a walking exit location that is associated with the vehicle based on its past behavior or settings.

The GOA may use parking_lot_info and vehicles_info to construct a cost matrix. The cost matrix may have rows representing vehicles and columns representing vacant parking spots, with the value representing the cost of assigning each vehicle to each parking spot. An illustrative example of a cost matrix is described below in connection with FIG. 15. For each vehicle looking for parking spot, GOA 502 may determine, from the vehicles_info and the parking_lot_info, which parking spots are a good fit for a respective vehicle by defining a fit score, f(v,s), where v is the vehicle and s is the spot. If a vehicle $V_1$ is not permitted to park in a spot $S_1$, the $f(V_1,S_1)$ will equal 0. In an embodiment, depending on the space size (e.g., due to the current parking status of the neighboring vehicles), the fit score will be calculated as a number between 1 and 10. For example, the fit score of vehicle/spot combination may be equal to 10 for a parking spot which is wide enough for the vehicle considering the driver's preference and skills, while a narrow parking spot into which the vehicle will barely fit will have a fit score of 1. For example, a parking spot located far from both the vehicle's current location and the driver's ultimate destination (e.g., a specific building) may be less fit than a parking spot closer the vehicle's current location and/or the destination. The fit score may also account for special requirements of the vehicle. For example, an EV may report is current battery status to the parking system. If the battery status indicates that the battery is below a threshold charge level (e.g., 15%), then the fit scores for the EV may be calculated to prioritize parking spots equipped with EV chargers. A cost for each vehicle/parking space pair may then be determined based on a weighted combination of the fit score and a time cost which accounts for total travel time of the vehicle and/or the occupants of the vehicle to their destination. In some embodiments, the time cost and fit score are weighted equally, such that the cost is calculated as the average of the time cost and the fit score. However, other weights or scale factors may be used. For example, the time cost may be more important that the fit score, with the time cost being given a weight of 0.7 and the fit score being given a weight of 0.3, or vice versa. In some implementations, only one of the time cost and fit score is scaled while the other value is not.

For each vehicle and each spot with a fit score greater than 0, a route may be planned from the current location of the vehicle to the spot using a navigation algorithm. Any route planning algorithms can be used, such as A*, Dijkstra, contraction hierarchies, etc. The route may be based on the location, speed, road congestion, etc. From the route, a time cost may be provided. For those vehicle/spot combinations having a fit score of 0, an infinite time cost value may be assigned so that those combinations will never be assigned. In one embodiment, the cost could be the driving time from the vehicle to the spot as calculated in above step. In other embodiments, the cost could be a weighted combination of the driving time cost, walking time cost, fit score, and other factors that may be taken into account. If the number of vehicles is not equal to the number of parking spots, the matrix may be balanced by adding dummy rows or columns. For additional parking spots, dummy vehicles with zero costs may be added to the matrix. For additional vehicles, dummy parking spots with high costs may be added. In the case of there are not enough parking spots, based on the time entering or time getting to the nearest parking spot, the system can communicate the information to those vehicles that are not able to get a spot.

Once the cost matrix is constructed, the global optimization can be performed using the Hungarian method to obtain an optimal assignment for each vehicle looking for a parking spot. If the fit scores are calculated as a value between 0 and 10, with 10 indicating an ideal fit, then the values in the cost matrix must be inverted, such that a value of 0 indicates an ideal fit. This can be accomplished by subtracting the fit score value from 10. For example, a fit score of 8 is converted to a value of 2, being the result of subtracting 8 from 10. The Hungarian method may then be performed to identify ideal parking spot assignments for each vehicle. First, the smallest element in each row is subtracted from all elements in that row to ensure at least one zero in each row. The smallest element in each column is then subtracted from all elements in that column to ensure at least one zero in each column. An initial assignment of vehicles to parking spots is may then be attempted by making an assignment where zeros appear in the matrix while ensuring that no two vehicles are assigned to the same spot and no vehicle is assigned more than one spot. If there is not a single zero in each row and column (i.e., not all vehicles can be assigned a spot), the matrix can be further adjusted. All zeros are covered with a minimum number of lines. The smallest non-covered number is then subtracted from all uncovered numbers and added to all numbers that are covered twice (i.e., at the intersections of the lines). The remaining assignments are then attempted. This process may be repeated until all assignments have been made.

This globally optimal algorithm aims to minimize the total time for all vehicles collectively, considering their unique exit preferences and current parking spot availabilities. It may be implemented in real-time, triggered by any of the trigger events, allowing for dynamic updating as vehicles move within the parking facility.

Figure 8:
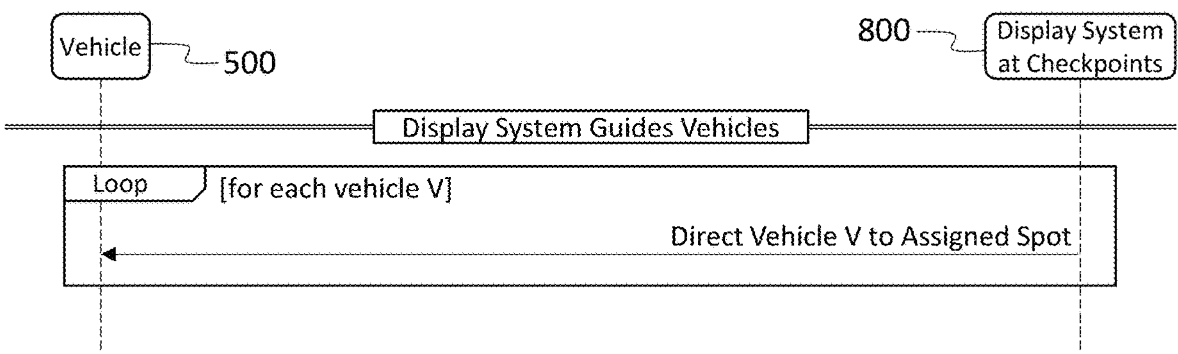
FIG. 8 is a sequence diagram for displaying guidance information to vehicles within a parking lot equipped with a parking guidance system, in accordance with some embodiments of the disclosure.

FIG. 8 is a sequence diagram for displaying guidance information to vehicles within a parking lot equipped with a parking guidance system, in accordance with some embodiments of the disclosure. Vehicle 500 may be assigned a parking spot within the parking facility. However, the driver of vehicle 500 may not know where the assigned spot is located. In some embodiments, the assigned spot is communicated to vehicle 500 and the driver may thus be informed of an identifier of the spot (e.g., a spot number). In order to get from the current location of vehicle 500 to the assigned parking spot, guidance is provided to vehicle 500 at various checkpoints throughout the parking facility. For each vehicle (e.g., vehicle 500) that arrives at a checkpoint, display system 800 may direct the vehicle to its assignment spot. Display system 800 may display directions to the driver of the vehicle or may transmit directions to an application associated with the parking system or a navigation application within the vehicle or on the driver's mobile device.

Figure 9:
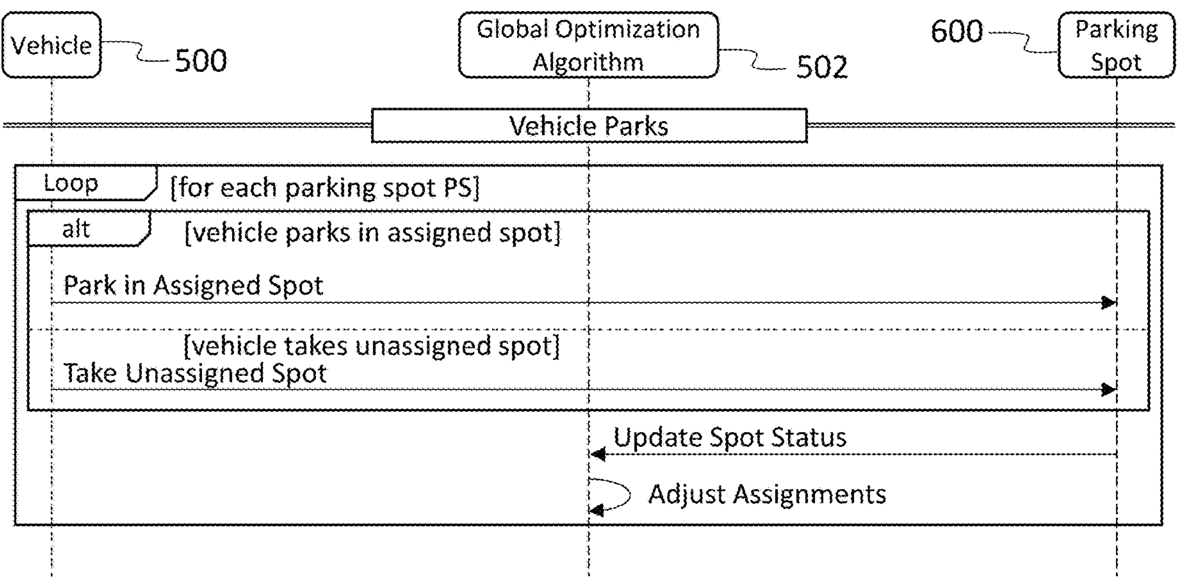
FIG. 9 is a sequence diagram for adjusting parking spot assignments after each vehicle parks, in accordance with some embodiments of the disclosure.

FIG. 9 is a sequence diagram for adjusting parking spot assignments after each vehicle parks, in accordance with some embodiments of the disclosure. Vehicle 500 parks in a parking spot. The driver of vehicle 500 may choose to park in the assigned parking spot or may choose to ignore the assignment or come upon another vehicle leaving a parking spot and choose to park in that spot. Whatever the case, a camera or other sensor at the parking spot (e.g., parking spot 600) detects that vehicle 500 has parked there. Parking spot 600 reports its status as occupied to GOA 502. In response to receiving the updated status of parking spot 600, GOA 502 adjusts all parking spot assignments globally throughout the parking facility.

Figure 10:
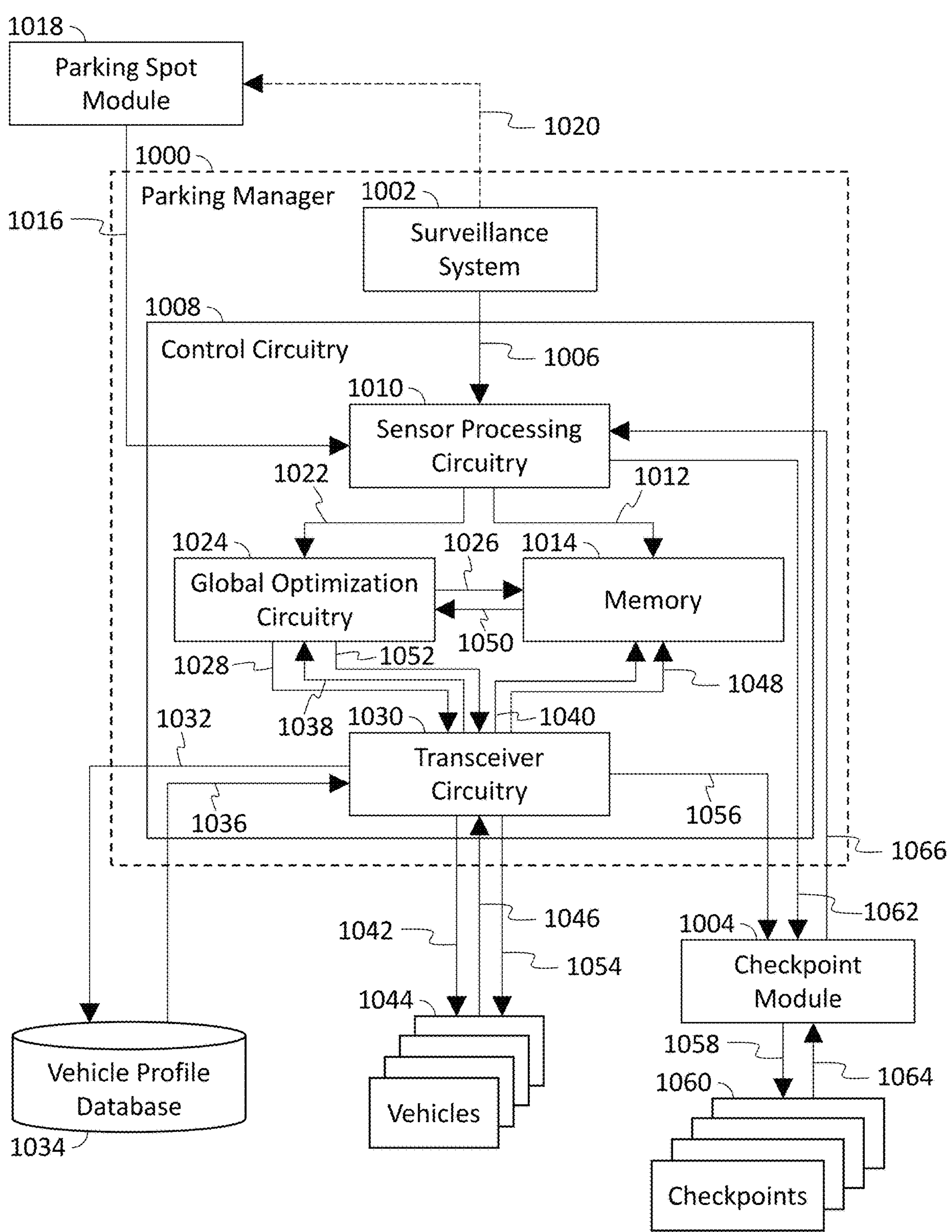
FIG. 10 is a block diagram representing components and data flow therebetween of a system for providing parking guidance to vehicles, in accordance with some embodiments of the disclosure.

FIG. 10 is a block diagram representing components and data flow therebetween of a system for providing parking guidance to vehicles, in accordance with some embodiments of the disclosure. Parking Manager 1000 may be located at the parking facility or in the cloud and serves several roles. Parking manager 1000 manages surveillance system 1002. Surveillance system 1002 may include cameras to monitor the entrances and exits of the parking facility, as well as the movements of vehicles and, in some cases, people within the parking facility. Parking manager 1000 also manages the status of all parking spots within the parking facility. Parking manager 1000 tracks whether each parking spot is empty or occupied. If a parking spot is occupied, parking manger 1000 may store a vehicle ID (e.g., a license plate number) in association with the parking spot. This information is updated whenever a vehicle moves into or out of a parking spot.

Parking manager 1000 may analyze images of vehicles received from surveillance system 1002 at entrance(s) to the parking facility and extract additional information about each vehicle, such as license plate number, color, make, model, size, and/or special parking requirements (disability or EV charger). Parking manager 1000 also tracks all vehicles through images received from surveillance system 1002 to identify the exact location, direction, and speed of each vehicle in the parking facility. Parking manager 1000 is also responsible for running the GOA to calculate the optimal spot for each vehicle to be parked and sending guidance/directions to the checkpoint module 1004.

Surveillance system 1002 transmits 1006 images or other sensor data to control circuitry 1008 where it is received using sensor processing circuitry 1010. Control circuitry 1008 may be based on any suitable processing circuitry and comprises control circuitry and memory circuitry, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Sensor processing circuitry 1010 processes the images or other sensor data received from surveillance system 1002 to identify the location of vehicles within the parking facility. Sensor processing circuitry 1010 may use a series of sequential images or sensor data to determine a speed and direction in which each vehicle is travelling. Sensor processing circuitry 1010 may identify vehicles within an image using edge detection or saliency filters to isolate individual objects within the image. Sensor processing circuitry 1010 may then compare the isolated objects to known shape profiles for different classes of vehicles. Sensor processing circuitry

1010 may perform a transformation on the shape profiles to compensate for any difference in perspective between the isolated object and the shape profiles. Other suitable image processing techniques may also be used. Sensor processing circuitry 1010 may also process information from infrared sensors, ultrasonic sensors, radar, lidar, or other suitable types of sensors to identify vehicles within the parking facility. Sensor processing circuitry 1010 may also extract an identifier of each vehicle, such as a license plate number, from the sensor data.

Sensor processing circuitry 1010 may transmit 1012 all information describing a vehicle to memory 1014. Memory 1014 may be any suitable electronic storage device such as random-access memory, read-only memory, hard drives, optical drives, solid state devices, quantum storage devices, or any other suitable fixed or removable storage devices, and/or any combination of the same. In some embodiments, location, direction, and speed of a vehicle may also be periodically stored in memory 1014. If the information received from sensor processing circuitry 1010 matches information for a vehicle that is already stored in memory 1014, memory 1014 may update the information stored in association with that vehicle.

Sensor processing circuitry 1010 may monitor the parking facility for a variety of trigger events. For example, sensor processing circuitry 1010 may monitor a camera or sensor positioned at or near an entrance to the parking facility to detect vehicles entering the parking facility. Sensor processing circuitry 1010 may similarly monitor an exit from the parking facility to detect vehicles exiting the parking facility. Sensor processing circuitry 1010 may receive 1016 data from parking spot module 1018 which manages sensors positioned at or near each parking spot or group of parking spots to detect vehicles taking or leaving parking spots and to identify vacant parking spots. In some embodiments, the sensors managed by parking spot module 1018 are part of surveillance system 1002, which may transmit 1020 images of parking spots to parking spot module 1018.

Each time a trigger event is detected by sensor processing circuitry 1010, sensor processing circuitry 1010 transmits 1022 all available sensor data to global optimization circuitry 1024. Global optimization circuitry 1024 uses the sensor data, such as vehicle positions, vehicle types, vacant parking spots, etc., to assign globally optimal parking spots to each vehicle. Global optimization circuitry 1024 may also request 1026 vehicle-specific information from memory 1014. In some embodiments, global optimization circuitry 1024 transmits 1028 a request for vehicle-specific information to transceiver circuitry 1030. Transceiver circuitry 1030 may comprise a data bus connection or physical data connection port (e.g., USB). Transceiver circuitry 1030 may also comprise a network connection over which data can be transmitted to and received from remote devices, such as an Ethernet connection, Wi-Fi connection, mobile broadband interface, or connection employing any other suitable network protocol. Transceiver circuitry 1030 transmits 1032 the request to vehicle profile database 1034. Vehicle profile database 1034 may be stored in a local storage device or a remote server. Vehicle profile database 1034 may be a generic automobile database and store information relating to each vehicle, such as its fuel type, length, weight, etc. In some embodiments, vehicle profile database 1034 may store information relating to each unique vehicle in addition to the generic information. For example, vehicle profile database 1034 may store parking preferences for each vehicle, common destinations for each vehicle, etc. This data may be useful in determining an optimal parking spot for a vehicle, as the suitability of a parking spot may be dependent on the driver's ultimate destination. For example, the driver may be going to a store located on the second floor of the east wing of a shopping mall. While a parking spot close to the first floor entrance to the shopping mall may be generally better than a parking spot that is far from the entrance, a parking spot that is located near a second floor entrance may better, and a parking spot located near a second floor entrance to the east wing of the shopping mall may be considered optimal.

In response to the request, vehicle profile database 1034 transmits 1036 vehicle profile data for each requested vehicle to control circuitry 1008, where it is received using transceiver circuitry 1030. Transceiver circuitry 1030 in turn transmits 1038 the data to global optimization circuitry 1024. In some embodiments, transceiver circuitry 1030 also transmits 1040 the vehicle profile data to memory 1014 for temporary storage while each vehicle in located within the parking facility. Upon detecting that a vehicle has exited the parking facility, vehicle profile data related to the vehicle may be deleted from memory 1014.

Transceiver circuitry 1030 may also transmit 1042 the request for vehicle-specific information to each of the vehicles 1044 that are located within the parking facility and that have not yet parked in a parking spot. Vehicles 1044 may transmit 1046 vehicle information including number of passengers, destination address if entered in a vehicle navigation application, fuel level (including battery charge level for EVs) to control circuitry 1008. Transceiver circuitry 1030 receives the information and may transmit it to global optimization circuitry 1024. Transceiver circuitry 1030 may also transmit 1048 the information to memory 1014 for temporary storage while each vehicle is location within the parking facility. Global optimization circuitry 1024 may retrieve 1050 any vehicle-specific information from memory 1014, rather than retrieving it from an external source and may only request information from an external source (e.g., vehicle profile database) for new vehicles entering the parking facility.

Global optimization circuitry 1024 assigns globally optimal parking spots to each vehicle. For example, global optimization circuitry 1024 identifies the available parking spots and determines a fitness or cost of each parking spot for each vehicle looking for parking. Global optimization circuitry 1024 constructs a cost matrix and then, using computational optimization techniques such as the Hungarian method, determines the optimal assignment of available parking spots to vehicles. Global optimization circuitry 1024, or another component of control circuitry 1008, may then plan a route for each vehicle to navigate from its current location to its assigned parking spot. Global optimization circuitry 1024 then transmits 1052 the assignments and planned routes to transceiver circuitry 1030.

In some embodiments, transceiver circuitry 1030 transmits 1054 the assignments and planned routes to vehicles 1044 where a companion application in a vehicle may receive the assignment. Alternatively, a navigation application such as Google Maps may provide a method or API by which parking manager 1000 may input a destination location and/or navigation guidance steps from the planned route for the vehicle. In some embodiments, transceiver circuitry 1030 transmits 1056 the assignments and planned routes to checkpoint module 1004. The assignments may include identifying information of each vehicle. Checkpoint module 1004 may transmit 1058 directions or other guidance information for each vehicle to checkpoints 1060 for display to each vehicle. Checkpoint module 1004 may receive 1062 data from sensor processing circuitry 1010 indicating which vehicle is approaching each checkpoint. Checkpoint module 1004 may then transmit 1058 the appropriate directions or guidance information to each checkpoint.

Whenever a vehicle passes one of checkpoints 1060, the checkpoint may transmit 1064 information to checkpoint module 1004 indicating whether the vehicle followed or ignored the directions or guidance data provided to the vehicle at the checkpoint. For example, each checkpoint may have a dedicated sensor to determine the direction a vehicle travels when passing through the checkpoint. If the sensor reports that the vehicle travelled in a direction other than the direction indicated in the directions or guidance data provided to the vehicle, checkpoint module 1004 may determine that the vehicle did not comply with the directions or guidance data. Checkpoint module 1004 may also transmit 1066 this information to sensor processing circuitry 1010. Based on this information, sensor processing circuitry 1010 may determine that a trigger event has occurred and cause global optimization circuitry 1024 to recalculate the globally optimal parking spot assignments for each vehicle.

Figure 11:
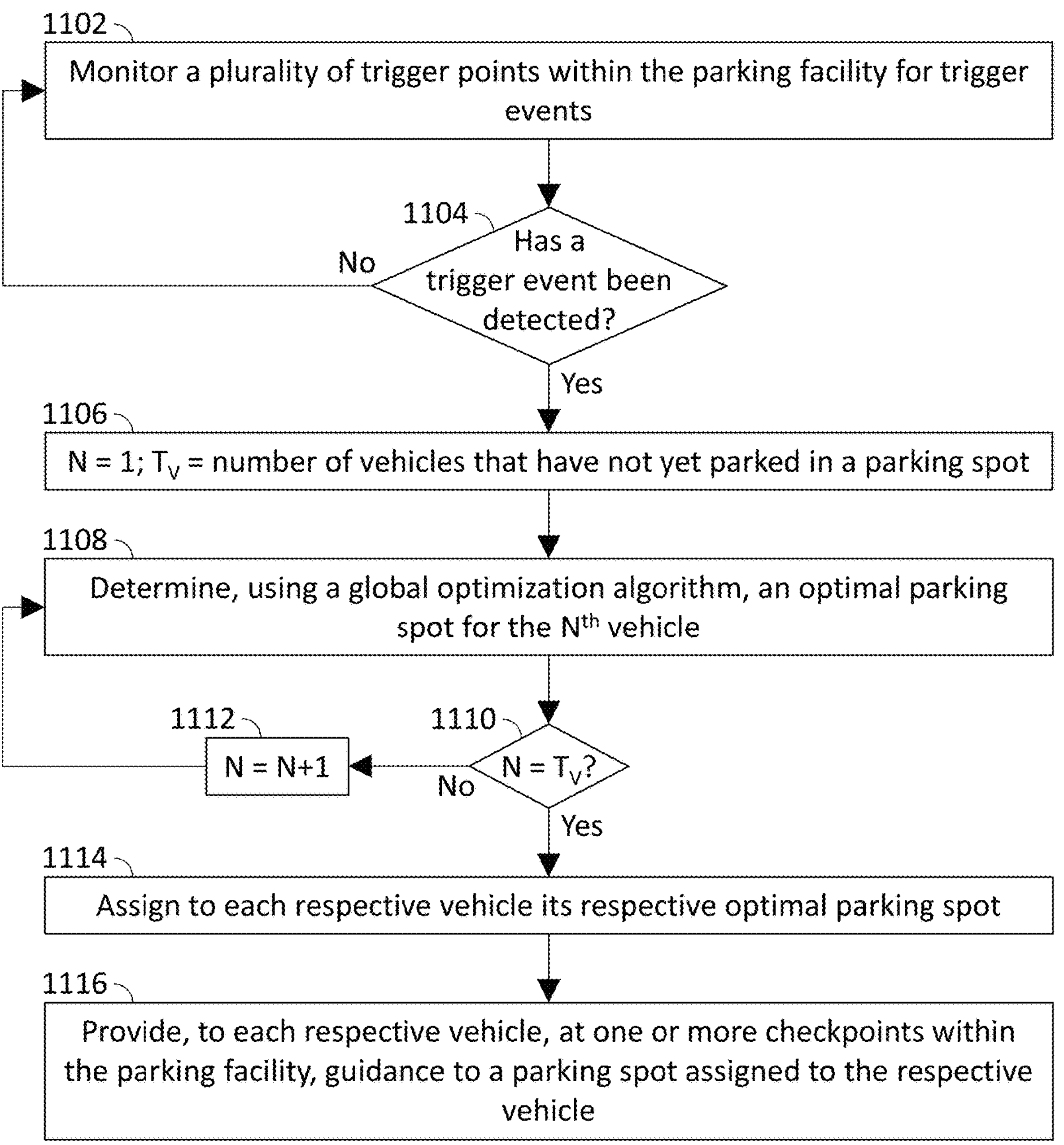
FIG. 11 is a flowchart representing an illustrative process for providing parking guidance for vehicles in a parking facility, in accordance with some embodiments of the disclosure.

FIG. 11 is a flowchart representing an illustrative process 1100 for providing parking guidance for vehicles in a parking facility, in accordance with some embodiments of the disclosure. Process 1100 may be implemented on control circuitry 1008. In addition, one or more actions of process 1100 may be incorporated into or combined with one or more actions of any other process or embodiment described herein.

At 1102, control circuitry 1008 monitors a plurality of trigger points within the parking facility for trigger events. The trigger points may include entrances, exits, any number of checkpoints, and any number of individual parking spots within the parking facility. Trigger events may include a vehicle entering the parking facility, a vehicle exiting the parking facility, a vehicle parking in a parking spot, a vehicle leaving a parking spot, a vehicle passing through a checkpoint, a person walking to their vehicle, and a vehicle discharging passengers without parking in a parking spot. Control circuitry 1008 may detect a trigger event based on data received from one or more surveillance devices or other sensors deployed within the parking facility.

At 1104, control circuitry 1008 determines whether a trigger event has been detected. Control circuitry 1008 may process data received from one or more surveillance devices or sensors to determine whether a trigger event has occurred. If a trigger event has not been detected ("No" at 1104), then processing returns to 1102 where control circuitry 1008 continues to monitor for trigger events. If a trigger event has occurred ("Yes" at 1104), then, at 1106, control circuitry 1008 initialized a counter variable N, setting its initial value to one, and a variable $T_V$ representing the number of vehicles within the parking facility that have not yet parking in a parking spot. Control circuitry 1008 may further process data from the surveillance devices and sensor to determine the number of vehicles within the parking facility that have not yet parked.

At 1108, control circuitry 1008 determines, using a global optimization algorithm, an optimal parking spot for the $N^{th}$ vehicle. For example, control circuitry 1008 may calculate a fitness score or cost for each available parking spot paired with each vehicle. Control circuitry 1008 may then construct a cost matrix and determine, using an optimization technique such as the Hungarian method, the optimal assignment for the $N^{th}$ vehicle. At 1110, control circuitry 1008 determines whether N is equal to $T_V$, meaning that an optimal assignment has been determined for every vehicle. If N is not equal to $T_V$ ("No" at 1110), then, at 1112, control circuitry 1008 increments the value of N by one and processing returns to 1108.

If N is equal to $T_V$ ("Yes" at 1110), then, at 1114, control circuitry 1008 assigns to each respective vehicle its respective optimal parking spot. For example, control circuitry 1008 may transmit to each respective vehicle an identifier of its assigned parking spot. In some embodiments, control circuitry 1008 may maintain a list, array, or other data structure in which assignments are stored.

At 1116, control circuitry 1008 provides, to each respective vehicle, at one or more checkpoints within the parking facility, guidance to a parking spot assigned to the respective vehicle. Control circuitry 1008 may use a route planning algorithm to determine a route from the vehicle's current location to its assigned parking spot. At each checkpoint the vehicle approaches, guidance may be displayed to the vehicle. For example, the checkpoint may include a display that indicates to the vehicle the direction in which it should proceed in order to reach its assigned parking spot. In some embodiments, checkpoints may first identify the approaching vehicle in order to display the correct guidance to the vehicle. In some embodiments, multiple vehicles may approach a checkpoint simultaneously or substantially simultaneously. The checkpoint may then display more specific information, such as an identifier of the vehicle (e.g., a license plate number) in association with the guidance so that drivers understand which guidance is intended for them. In some implementations, the guidance may include an audio component, such as an announcement of the direction in which the vehicle should proceed.

The actions and descriptions of FIG. 11 may be used in any other embodiment of this disclosure. In addition, the actions and descriptions described in relation to FIG. 11 may be done in suitable alternative orders or in parallel to further the purposes of this disclosure.

Figure 12:
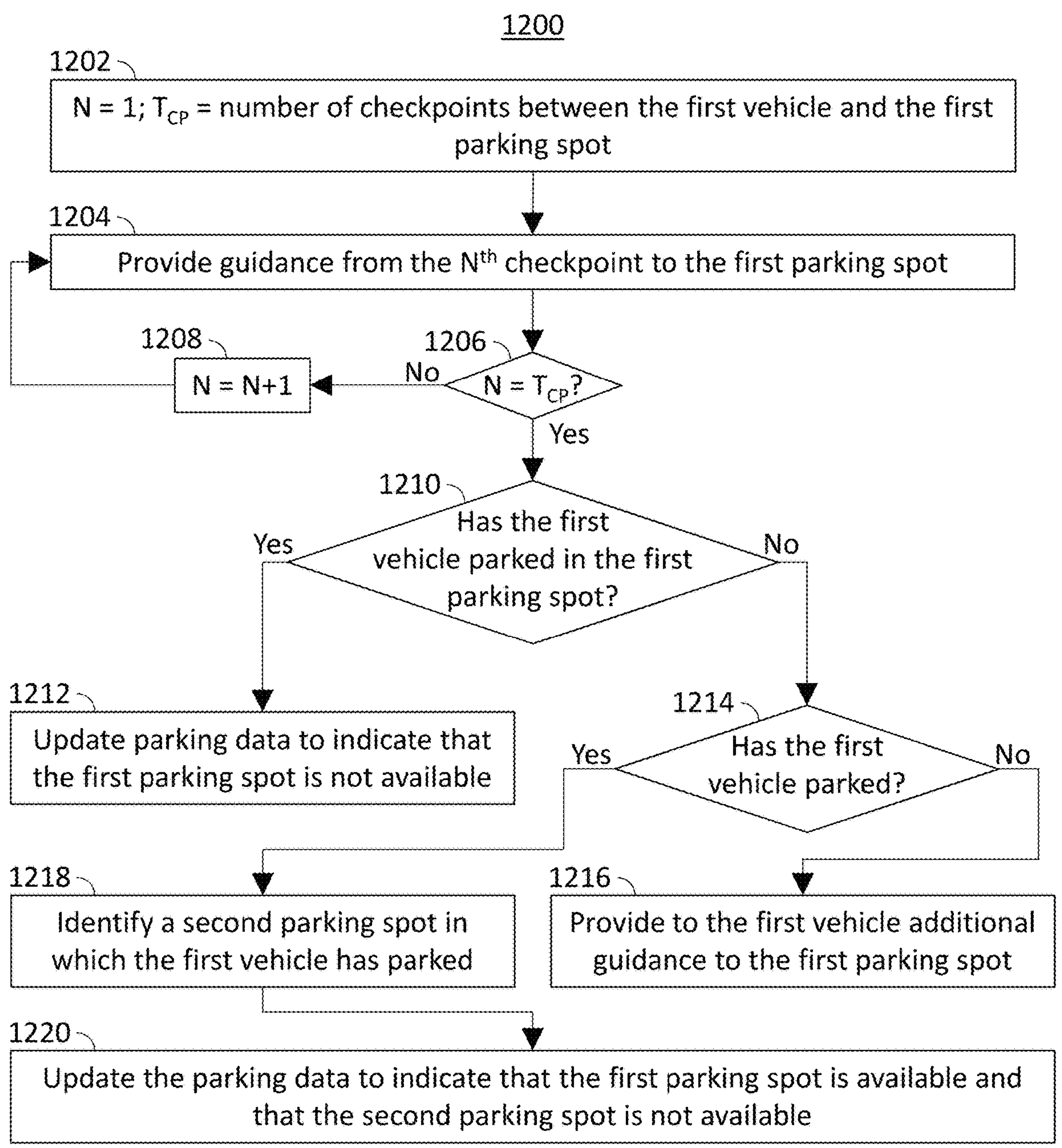
FIG. 12 is a flowchart representing an illustrative process for updating parking data based on vehicle actions, in accordance with some embodiments of the disclosure.

FIG. 12 is a flowchart representing an illustrative process 1200 for updating parking data based on vehicle actions, in accordance with some embodiments of the disclosure. Process 1200 may be implements on control circuitry 1008. In addition, one or more actions of process 1200 may be incorporated into or combined with one or more actions of any other process or embodiment described herein.

At 1202, control circuitry 1008 initializes a counter variable N, setting its initial value to one, and a variable $T_{CP}$ representing the number of checkpoints between a first vehicle and its assigned parking spot. The number of checkpoints may be based on a route planned by control circuitry 1008.

At 1204, control circuitry 1008 provides guidance from the $N^{th}$ checkpoint to the assigned parking spot. Guidance may be provided by outputting visual and/or audible directional guidance to the vehicle. The guidance may be output publicly at the checkpoint, or may be output privately to the vehicle through a companion application within the vehicle or on the driver's smartphone or other mobile device.

At 1206, control circuitry 1008 determines whether N is equal to $T_{CP}$, meaning that guidance has been provided to the vehicle at each checkpoint. This may assume that the driver of the vehicle has complied with or followed the provided guidance at each checkpoint. If N is not equal to $T_{CP}$ ("No" at 1206), then the vehicle has not yet reached its assigned parking spot and, at 1208, control circuitry 1008 increments the value of N by one. Processing then returns to 1204 where further guidance is provided at the next checkpoint.

If N is equal to $T_{CP}$ ("Yes" at 1206), then, at 1210, control circuitry 1008 determines whether the vehicle has parked in its assigned parking spot. Control circuitry 1008 may determine this using any suitable sensors or cameras deployed within the parking facility. For example, an image captured by a surveillance camera may be processed to confirm whether the assigned spot is occupied by the vehicle. If the vehicle has parked in its assigned parking spot ("Yes" at 1210), then, at 1212, control circuitry 1008 updates parking data to indicate that the assigned parking spot is not available for further assignments.

If the vehicle has not parked in the assigned parking spot ("No" at 1210), then, at 1214, control circuitry 1008 determines whether the vehicle has parked at all. For example, control circuitry 1008 may use one or more surveillance cameras and/or sensors to track the movement of the vehicle through the parking facility. Control circuitry 1008 may determine that the vehicle passed the assigned parking spot without parking, or that the vehicle has parked in a different parking spot other than the one to which it was assigned.

If the vehicle has not parked ("No" at 1214), then, at 1216, control circuitry 1008 provides to the vehicle additional guidance to the assigned parking spot. For example, control circuitry 1008 may plan a new route from the vehicle's location to the assigned parking spot. Guidance directions can then be provided at checkpoints approached by the vehicle as described above until the vehicle returns to the assigned parking spot. In some embodiments, however, the vehicle not parking in its assigned parking spot may be a trigger event. In response, control circuitry 1008 may instead globally recalculate the optimal parking spot assignments.

If the vehicle has parked in a different parking spot ("Yes" at 1214), then, at 1218, control circuitry 1008 identifies the parking spot in which the vehicle has parked. For example, control circuitry 1008 may use surveillance cameras and/or sensors to track the location of the vehicle within the parking facility and determine where the vehicle has parked. At 1220, control circuitry 1008 then updates the parking data to indicate that the originally assigned parking spot is available to be assigned to another vehicle and that the parking spot in which the vehicle ultimately parked is not available. If the parking spot in which the vehicle ultimately parked was already assigned to another vehicle, control circuitry 1008 may globally recalculate the optimal parking spot assignments.

The actions and descriptions of FIG. 12 may be used in any other embodiment of this disclosure. In addition, the actions and descriptions described in relation to FIG. 12 may be done in suitable alternative orders or in parallel to further the purposes of this disclosure.

Figure 13:
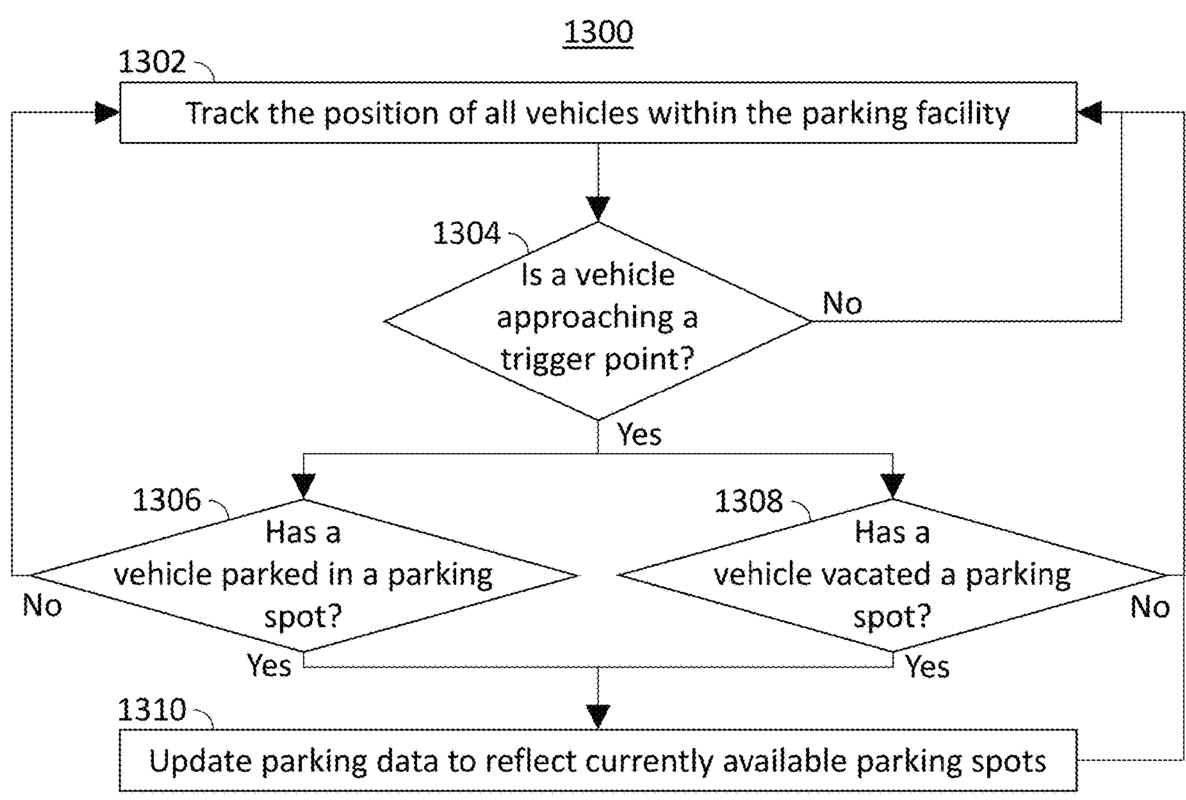
FIG. 13 is a flowchart representing a second illustrative process for updating parking data based on vehicle actions, in accordance with some embodiments of the disclosure.

FIG. 13 is a flowchart representing a second illustrative process 1300 for updating parking data based on vehicle actions, in accordance with some embodiments of the disclosure. Process 1300 may be implements on control circuitry 1008. In addition, one or more actions of process 1300 may be incorporated into or combined with one or more actions of any other process or embodiment described herein.

At 1302, control circuitry 1008 tracks the position of all vehicles within the parking facility. Control circuitry 1008 may receive data from any number of surveillance cameras and/or other sensors. Control circuitry 1008 may process this data to determine the position of vehicles within the parking facility. This may be accomplishes using methods described above in connection with FIG. 10.

At 1304, control circuitry 1008 determines whether a vehicle is approaching a trigger point. For example, control circuitry 1008 may determine that the position of a vehicle is within a threshold distance of a trigger point, such as a checkpoint or an available parking spot. To prevent false positives from vehicle that have already passed a trigger point, control circuitry 1008 may use two or more successive captured positions of a vehicle to determine its direction of travel and confirm that the vehicle is approaching the trigger point rather than moving away from the trigger point. Control circuitry 1008 may alternatively use an orientation of the vehicle to determine whether the vehicle is approaching or moving away from the trigger point.

If no vehicles are determined to be approaching a trigger point ("No" at 1304), then processing returns to 1302 and control circuitry 1008 continues to track the position of all vehicles within the parking facility. If a vehicle is determined to be approaching a trigger point ("Yes" at 1304), then control circuitry 1008 performs additional determinations. At 1306, control circuitry 1008 determines whether a vehicle has parked in a parking spot. This may be accomplished using methods described above in connection with FIG. 12. At 1308, control circuitry 1008 determines whether a vehicle has vacated a parking spot. This may be accomplished using methods similar to those for determining whether a vehicle has parked in a parking spot. If any vehicle has parked in a parking spot ("Yes" at 1306) or vacated a parking spot ("Yes" at 1308), then, at 1310, control circuitry 1008 updates parking data to reflect currently available parking spots. This may be accomplished using methods described above in connection with FIG. 12. After updating the parking data, or if no vehicles have parked in ("No" at 1306) or vacated ("No" at 1308) any parking spots, processing returns to 1302 and control circuitry 1008 continues to track the position of all vehicles within the parking facility.

The actions and descriptions of FIG. 13 may be used in any other embodiment of this disclosure. In addition, the actions and descriptions described in relation to FIG. 13 may be done in suitable alternative orders or in parallel to further the purposes of this disclosure.

Figure 14:
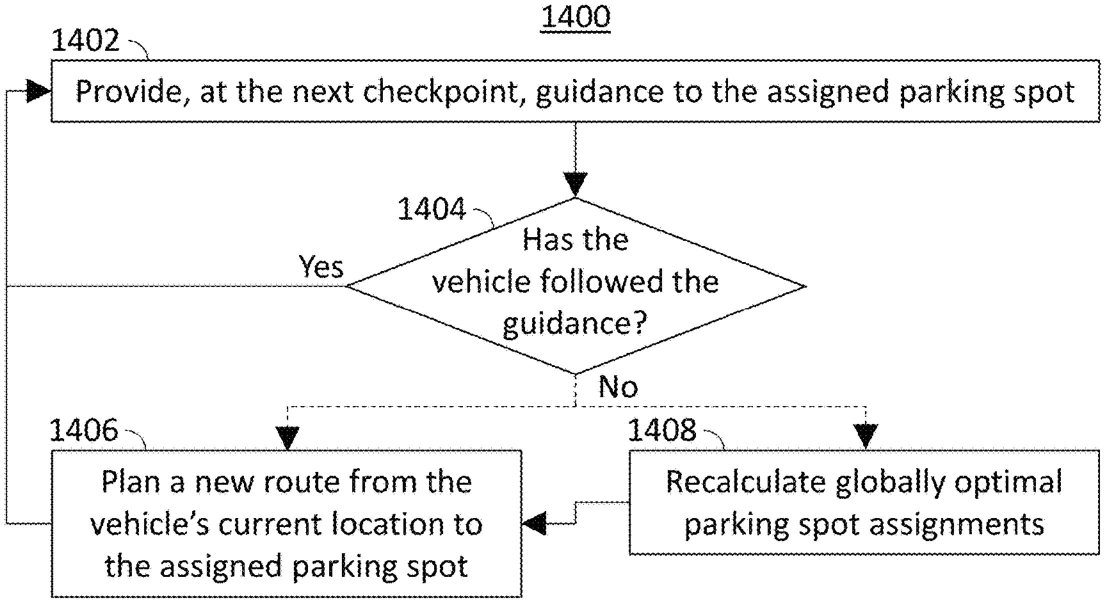
FIG. 14 is a flowchart representing an illustrative process for updating guidance and/or parking spot assignments based on vehicle compliance with provided guidance, in accordance with some embodiments of the disclosure.

FIG. 14 is a flowchart representing an illustrative process 1400 for updating guidance and/or parking spot assignments based on vehicle compliance with provided guidance, in accordance with some embodiments of the disclosure. Process 1400 may be implements on control circuitry 1008. In addition, one or more actions of process 1400 may be incorporated into or combined with one or more actions of any other process or embodiment described herein.

At 1402, control circuitry 1008 provides, at the next checkpoint approached by the vehicle, guidance to the assigned parking spot. The guidance may be provided when the vehicle is determined to be at or approaching the next checkpoint using methods described above in connection with FIG. 12. At 1404, control circuitry 1008 determines whether the vehicle has followed the guidance. For example, the guidance provided at the checkpoint may be to make a left turn. Control circuitry 1008 may use surveillance cameras and/or other sensors to confirm whether the vehicle made a left turn at the checkpoint or proceeded in a different direction. If the vehicle followed the guidance ("Yes" at 1404), then processing returns to 1402, where guidance is provided when the vehicle is determined to be at or approaching the next checkpoint.

If the vehicle did not follow the guidance ("No" at 1404), then, at 1406, control circuitry 1008 plans a new route from the vehicle's current location to the assigned parking spot.

Guidance steps based on the new route may be transmitted to one or more checkpoints. Processing then returns to 1402. Alternatively, at 1408, control circuitry 1008 recalculates globally optimal parking spot assignments for all vehicles. Processing then continues at 1406, where control circuitry 1008 plans a new route for the vehicle to its newly assigned parking spot.

The actions and descriptions of FIG. 14 may be used in any other embodiment of this disclosure. In addition, the actions and descriptions described in relation to FIG. 14 may be done in suitable alternative orders or in parallel to further the purposes of this disclosure.

Figure 15:
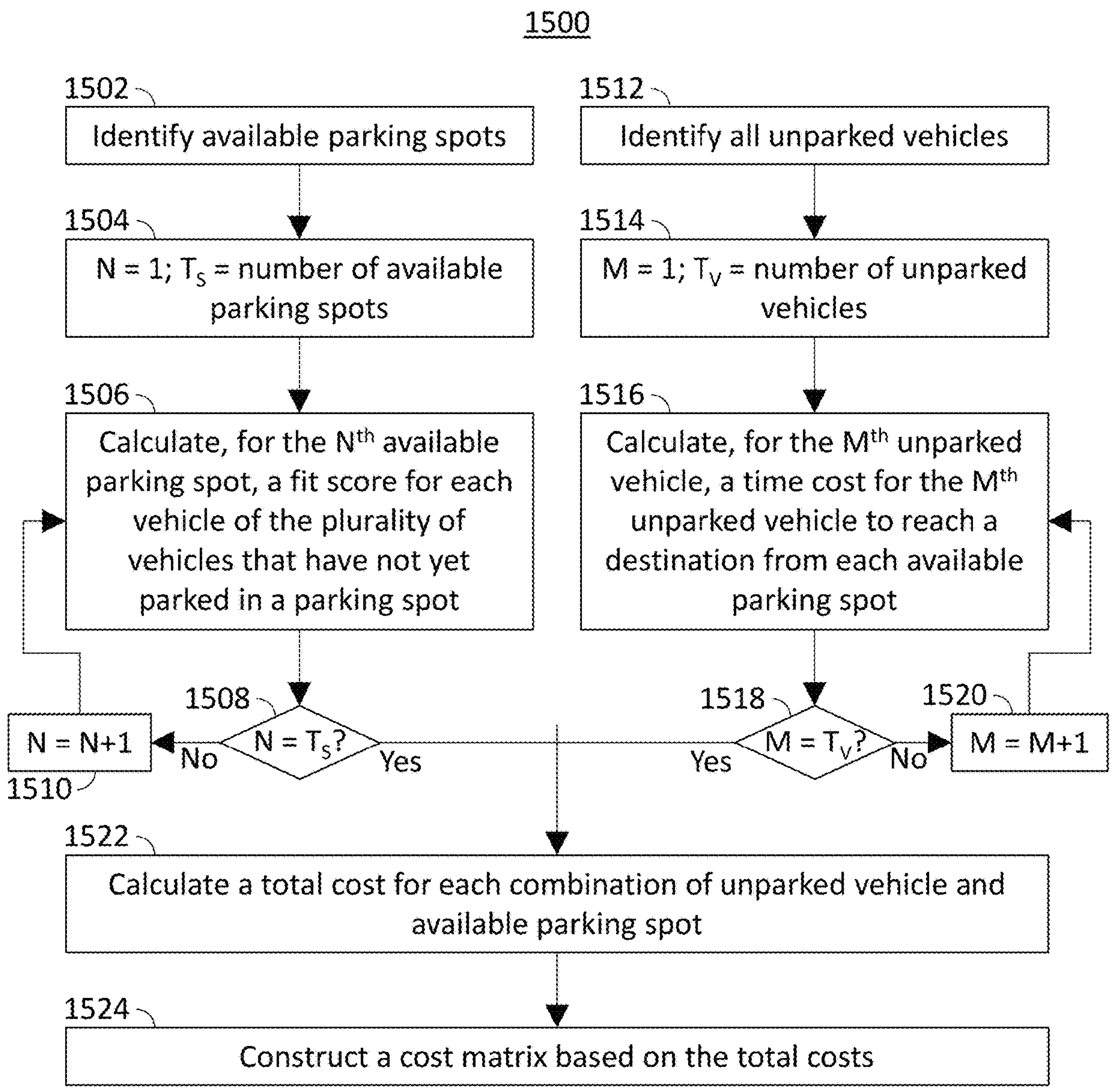
FIG. 15 is a flowchart representing an illustrative process for constructing a cost matrix for assigning vehicles to available parking spots, in accordance with some embodiments of the disclosure.

FIG. 15 is a flowchart representing an illustrative process 1500 for constructing a cost matrix for assigning vehicles to available parking spots, in accordance with some embodiments of the disclosure. Process 1500 may be implements on control circuitry 1008. In addition, one or more actions of process 1500 may be incorporated into or combined with one or more actions of any other process or embodiment described herein.

At 1502, control circuitry 1008 identifies available parking spots in the parking facility. For example, control circuitry 1008 may use any number of surveillance cameras and/or sensors to determine, for each parking spot, whether the parking spot is vacant or occupied. In some embodiments, control circuitry 1008 may maintain a list, array, or other data structure identifying which parking spots are occupied as vehicles park in parking spots. Control circuitry 1008 may then retrieve this data from memory.

At 1504, control circuitry 1008 initializes a counter variable N, setting its initial value to one, and a variable $T_S$ representing the number of available parking spots. At 1506, control circuitry 1008 calculates, for the $N^{th}$ available parking spot, a fit score for each vehicle of the plurality of vehicles that have not yet parked in a parking spot. This may be accomplished using methods described above in connection with FIG. 5.

At 1508, control circuitry 1008 determines whether N is equal to $T_S$, meaning that fit scores have been calculated for all vehicles for each available parking spot. If N is not equal to $T_S$ ("No" at 1408), then, at 1510, control circuitry 1008 increments the value of N by one, and processing returns to 1506.

At 1512, control circuitry 1008 identifies all unparked vehicles. These are vehicles that are not currently parked in a parking spot. In some embodiments, control circuitry 1008 determines which vehicles have vacated parking spots and are proceeding to an exit of the parking facility. Such vehicles are then excluded from the identified set of vehicles. Control circuitry 1008 may identify these vehicles using methods described above in connection with FIG. 10.

At 1514, control circuitry 1008 initializes a counter variable M, setting its initial value to one, and a variable $T_V$ representing the number of unparked vehicles. At 1516, control circuitry 1008 calculates, for the $M^{th}$ unparked vehicle, a time cost for the $M^{th}$ vehicle to reach a destination from each available parking spot. For example, control circuitry 1008 may determine that the destination of the $M^{th}$ vehicle, or an occupant of the $M^{th}$ vehicle, is a specific building or business served by the parking facility. Control circuitry 1008 may then determine an amount of time needed for the $M^{th}$ vehicle to reach the specific building or business or an amount of time needed for an occupant of the $M^{th}$ vehicle to walk to the specific building or business from each available parking spot. Control circuitry 1008 may access, request, or retrieve user information of the vehicle occupant(s) that may include average walking speed of the occupant(s), any physical disabilities or temporary injuries suffered by the occupant(s), or any other information that may be used to determine a time needed to walk a given distance.

At 1518, control circuitry 1008 determines whether M is equal to $T_V$, meaning that a time cost has been calculated for every unparked vehicle from each available parking spot. If M is not equal to $T_V$ ("No" at 1518), then, at 1520, control circuitry 1008 increments the value of M by one, and processing returns to 1516.

If N is equal to $T_S$ ("Yes" at 1508) and M is equal to $T_V$ ("Yes" at 1518), then, at 1520, control circuitry 1008 calculates a total cost for each combination of unparked vehicle and available parking spot based on the fit score and time cost for each respective combination. For example, control circuitry 1008 may scale the time cost and/or the fit score such that both the time fit score and the time cost may be represented as a value between 0 and 10. Control circuitry 1008 may then take the average of the two values as the total cost. In some embodiments, one or more of the fit score and the time cost may be weighted such that one factor has a greater effect of the total cost than the other.

At 1524, control circuitry 1008 constructs a cost matrix based on the total costs. For example, control circuitry 1008 may construct a matrix in with a number of columns equal to the number of available parking spots and a number of rows equal to the number of vehicles that have not yet parked. The matrix is then populated with the total cost for each vehicle/spot combination.

The actions and descriptions of FIG. 15 may be used in any other embodiment of this disclosure. In addition, the actions and descriptions described in relation to FIG. 15 may be done in suitable alternative orders or in parallel to further the purposes of this disclosure.

FIG. 16 is an illustrative example of a cost matrix 1600 for assigning vehicles to available parking spots, in accordance with some embodiments of the disclosure. Cost matrix 1600 is constructed with a number of columns equal to the number of available parking spots and a number of rows equal to the number of vehicles that have not yet parked. In this example, there are ten available parking spots and four vehicles that have not yet parked. The total cost calculated for each vehicle/spot combination are populated in the cost matrix. For example, the combination of Vehicle 1 and Spot 21 has a fit score of 8, the combination of Vehicle 1 and Spot 33 has a fit score of 6, etc. In this example, Spot 51, Spot 52, Spot 54, and Spot 55 are equipped with EV chargers and are reserved for EVs needing to charge their batteries. In this example, Vehicle 1, Vehicle 2, and Vehicle 3 are not EVs and so the combinations of these vehicles and spots are all assigned a value of 0. Vehicle 4 is an EV and so the fit scores for its combination with spots other than those equipped with EV chargers are all assigned a value of 0.

Figure 17:
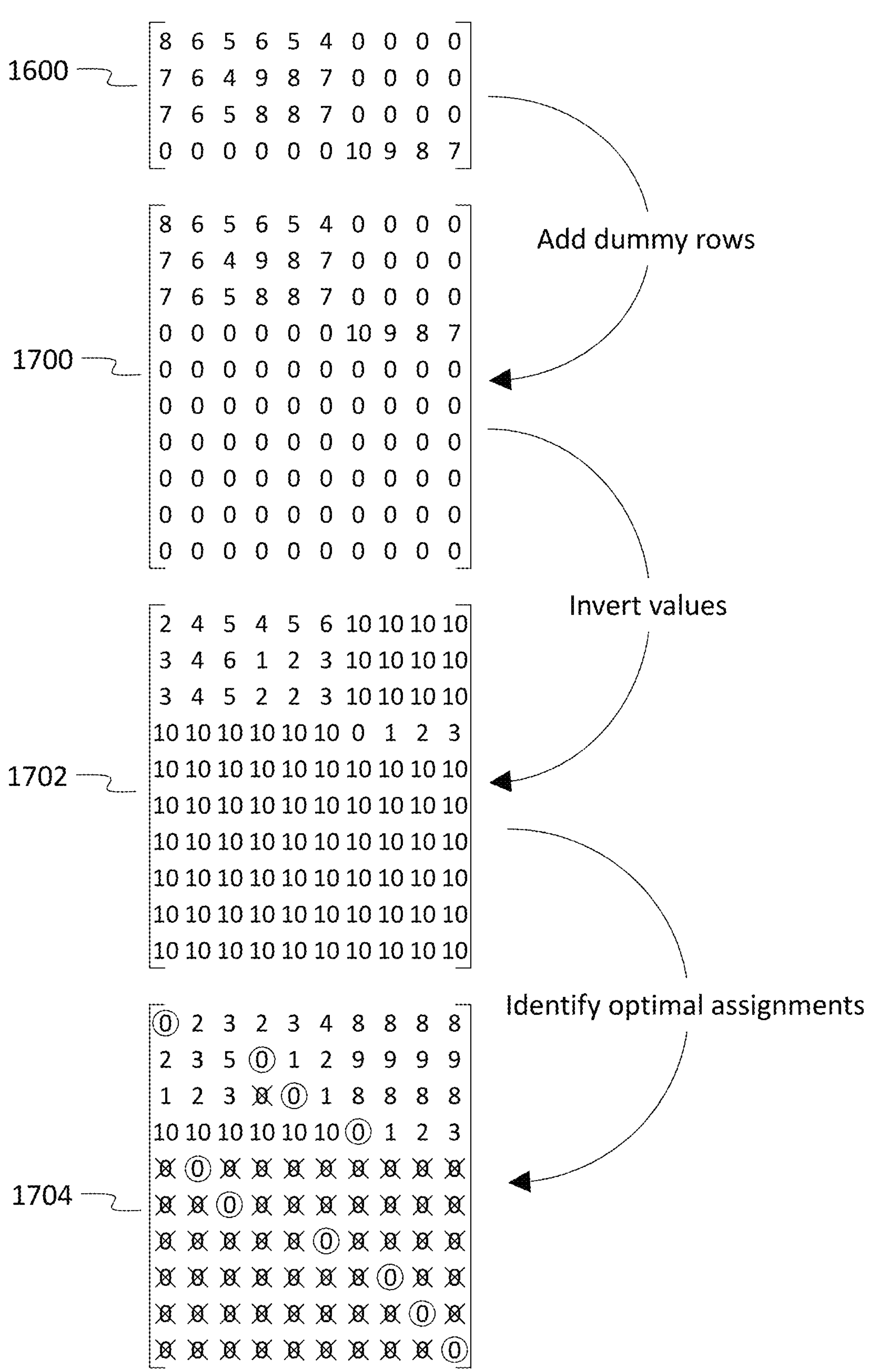
FIG. 17 is an illustrative example of identifying optimal parking spot assignment using a cost matrix, in accordance with some embodiments of the disclosure.

FIG. 17 is an illustrative example of identifying optimal parking spot assignment using a cost matrix, in accordance with some embodiments of the disclosure. Continuing with the example of FIG. 16, cost matrix 1600 is first processed to balance the number of rows and columns in the matrix. In this example, there are ten available parking spots and only four vehicles. Six "dummy" rows, all populated with 0s, are added to create a 10×10 matrix 1700.

In the example of FIG. 17, the Hungarian method is used, but any computational optimization technique may be used. In the Hungarian method, a 0 indicates an optimal assignment. If the total costs are calculated on a scale of 0 to 10, with 10 being best, then the values in the cost matrix must be inverted before further processing can occur. To accomplish this, every value in the matrix is replaced by the difference of 10 and the original value. Thus, an original cost of 8 results in a value of 2, being the different of 10 and 8. The resulting inverted value matrix 1702 can then be further processed.

Processing of matrix 1702 begins with row reduction. The smallest element in each row is subtracted from all elements in that row to ensure at least one zero in each row. Column reduction is then performed. This is similar to row reduction. The smallest element in each column is subtracted from all elements in that column to ensure at least one zero in each column. An initial assignment of vehicles to parking spots is then attempted by encircling zeros in the matrix while ensuring that no two vehicles are assigned to the same spot and no vehicle is assigned more than one spot, as shown at 1704. If there is not a single zero in each row and column (i.e., not all vehicles can be assigned a spot), all zeros are covered using a minimum number of lines. This step is crucial to prepare for further adjustments to the matrix. The smallest non-covered number is subtracted from all uncovered numbers and added to all numbers that are covered twice (i.e., at the intersections of the lines). Assignments are then attempted again.

The processes described above are intended to be illustrative and not limiting. One skilled in the art would appreciate that the steps of the processes described herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should be noted that the systems and/or methods described above may be applied to, or used in accordance with, other systems and/or methods.

What is claimed is:

1. A method for providing parking guidance for vehicles in a parking facility, the method comprising:

monitoring, by monitoring circuitry, a plurality of trigger points within the parking facility for trigger events; and for each trigger event detected within the parking facility:

determining, by control circuitry, using a global optimization algorithm, for each respective vehicle of a plurality of vehicles within the parking facility that have not yet parked in a parking spot, a respective optimal parking spot, wherein the plurality of vehicles within the parking facility that have not yet parked in a parking spot includes vehicles to which a parking spot has previously been assigned;

assigning to each respective vehicle of the plurality of vehicles, by the control circuitry, its respective optimal parking spot, wherein, for a respective vehicle of the plurality of vehicles to which a parking spot has previously been assigned, the respective optimal parking spot assigned to the respective vehicle may differ from a parking spot previously assigned to the respective vehicle;

providing, to each respective vehicle of the plurality of vehicles, by the control circuitry, at one or more checkpoints within the parking facility, guidance to a parking spot assigned to the respective vehicle, wherein the guidance does not identify the parking spot assigned to the respective vehicle; and based at least in part on determining that the respective vehicle is within a threshold distance of a parking spot assigned to the respective vehicle, identifying, to the respective vehicle, the parking spot assigned to the respective vehicle.

2. The method of claim 1, wherein the global optimization algorithm minimizes a total estimated travel time for the plurality of vehicles.

3. The method of claim 2, wherein the total estimated travel time represents a total amount of time for all vehicles of the plurality of vehicles to reach an assigned parking spot.

4. The method of claim 2, wherein the total estimated travel time represents a total amount of time for occupants of all vehicles of the plurality of vehicles to reach their respective destinations, and wherein a travel time for occupants of the respective vehicle includes an amount of time needed to walk from an assigned parking spot to their respective destination.

5. The method of claim 1, wherein assigning to each vehicle of the plurality of vehicles, by the control circuitry, its respective optimal parking spot comprises:

identifying, by the control circuitry at least one available parking spot;

calculating, by the control circuitry, for each available parking spot, a respective cost for each vehicle of the plurality of vehicles, wherein the respective cost is based at least in part on a fit score representing how well a respective parking spot matches with the respective vehicle and a time cost to reach a destination from each available parking spot; and constructing a cost matrix based at least in part on the fit score.

6. The method of claim 1, further comprising:

collecting, by the control circuitry, information describing each vehicle of the plurality of vehicles; and storing, by the control circuitry, the collected information.

7. The method of claim 1, further comprising tracking, by the control circuitry, a position of each vehicle of the plurality of vehicles within the parking facility.

8. The method of claim 7, wherein tracking, by the control circuitry, the position of each vehicle of the plurality of vehicles within the parking facility comprises:

capturing, by the control circuitry, one or more images of each respective vehicle of the plurality of vehicles using one or more cameras; and determining, by the control circuitry, based at least in part on the one or more images and a respective location of each of the one or more cameras, a current position of each respective vehicle of the plurality of vehicles.

9. The method of claim 1, wherein providing, to each respective vehicle of the plurality of vehicles, by the control circuitry, at the one or more checkpoints within the parking facility, the guidance to the parking spot assigned to the respective vehicle comprises:

transmitting, by the control circuitry, to each respective vehicle, as the respective vehicle reaches the one or more checkpoints, an indication of a direction in which a first vehicle should proceed.

10. The method of claim 9, wherein the indication comprises one or more of a visual indication, an audio indication, or a text indication.

11. The method of claim 1, wherein the plurality of trigger points comprises one or more of an entrance to the parking facility, an exit from the parking facility, any number of parking spots within the parking facility, or any number of checkpoints within the parking facility.

12. A system for providing parking guidance for vehicles in a parking facility, the system comprising:

monitoring circuitry configured to monitor a plurality of trigger points within the parking facility for trigger events; and control circuitry configured to, for each trigger event detected within the parking facility:

determine, using a global optimization algorithm, for each respective vehicle of a plurality of vehicles within the parking facility that have not yet parked in a parking spot, a respective optimal parking spot, wherein the plurality of vehicles within the parking facility that have not yet parked in a parking spot includes vehicles to which a parking spot has previously been assigned;

assign to each respective vehicle of the plurality of vehicles its respective optimal parking spot, wherein, for a respective vehicle of the plurality of vehicles to which a parking spot has previously been assigned, the respective optimal parking spot assigned to the respective vehicle may differ from a parking spot previously assigned to the respective vehicle;

provide, to each respective vehicle of the plurality of vehicles, at one or more checkpoints within the parking facility, guidance to a parking spot assigned to the respective vehicle, wherein the guidance does not identify the parking spot assigned to the respective vehicle; and based at least in part on determining that the respective vehicle is within a threshold distance of a parking spot assigned to the respective vehicle, identifying, to the respective vehicle, the parking spot assigned to the respective vehicle.

13. The system of claim 12, wherein the global optimization algorithm minimizes a total estimated travel time for the plurality of vehicles.

14. The system of claim 13, wherein the total estimated travel time represents a total amount of time for all vehicles of the plurality of vehicles to reach an assigned parking spot.

15. The system of claim 13, wherein the total estimated travel time represents a total amount of time for occupants of all vehicles of the plurality of vehicles to reach their respective destinations, and wherein a travel time for occupants of the respective vehicle includes an amount of time needed to walk from an assigned parking spot to their respective destination.

16. The system of claim 12, wherein the control circuitry is further configured to:

identify at least one available parking spot;

calculate, for each available parking spot, a respective cost for each vehicle of the plurality of vehicles, wherein the respective cost is based at least in part on a fit score representing how well a respective parking spot matches with the respective vehicle and a time cost to reach a destination from each available parking spot; and construct a cost matrix based at least in part on the fit score.

17. The system of claim 12, further comprising:

a memory;

wherein the control circuitry is further configured to:

collect information describing each vehicle of the plurality of vehicles; and store the collected information in the memory.

18. The system of claim 12, wherein the control circuitry is further configured to track a position of each vehicle of the plurality of vehicles within the parking facility.

19. The system of claim 18, wherein the control circuitry is configured to track the position of each vehicle of the plurality of vehicles within the parking facility by:

capturing one or more images of each respective vehicle of the plurality of vehicles using one or more cameras; and determining, based at least in part on the one or more images and a respective location of each of the one or more cameras, a current position of each respective vehicle of the plurality of vehicles.

20. The system of claim 12, wherein the control circuitry is configured to provide, to each respective vehicle of the plurality of vehicles, at the one or more checkpoints within the parking facility, the guidance to the parking spot assigned to the respective vehicle by:

transmitting, to each respective vehicle, as the respective vehicle reaches the one or more checkpoints, an indication of a direction in which a first vehicle should proceed.

21. The system of claim 20, wherein the indication comprises one or more of a visual indication, an audio indication, or a text indication.

22. The system of claim 12, wherein the plurality of trigger points comprises one or more of an entrance to the parking facility, an exit from the parking facility, any number of parking spots within the parking facility, or any number of checkpoints within the parking facility.

* * * * *